(12) United States Patent
Suda

(10) Patent No.: US 6,933,978 B1
(45) Date of Patent: Aug. 23, 2005

(54) FOCUS DETECTING DEVICE WITH PHOTOELECTRIC CONVERSION PORTION HAVING MICROLENS AND WITH LIGHT BLOCKING PORTION HAVING FIRST AND SECOND OPENINGS

(75) Inventor: Yasuo Suda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 761 days.

(21) Appl. No.: 09/698,241

(22) Filed: Oct. 30, 2000

(30) Foreign Application Priority Data

Oct. 28, 1999 (JP) .......................................... 11-306815

(51) Int. Cl.[7] ........................ H04N 5/232; G02B 27/10; G02B 7/28
(52) U.S. Cl. ........................ 348/345; 359/625; 396/111
(58) Field of Search ................................ 348/345–350, 348/353, 362–364, 273, 335–336; 356/4.03–4.04; 359/625–626, 684; 396/89, 93, 101–114, 128, 133; 250/201.2–201.8

(56) References Cited

U.S. PATENT DOCUMENTS

| | | | |
|---|---|---|---|
| 4,047,807 A | * | 9/1977 | Okano et al. ............... 359/234 |
| 4,410,804 A | | 10/1983 | Stauffer ....................... 250/578 |
| 4,555,169 A | | 11/1985 | Suda et al. .................. 354/407 |
| 4,618,236 A | | 10/1986 | Akashi et al. ............... 354/406 |
| 4,634,255 A | | 1/1987 | Suda et al. .................. 354/406 |
| 4,643,557 A | | 2/1987 | Ishizaki et al. ............. 354/406 |
| 4,670,645 A | | 6/1987 | Ohtaka et al. .............. 250/201 |
| 4,688,920 A | | 8/1987 | Suda et al. .................. 354/406 |
| 4,709,138 A | | 11/1987 | Suda et al. .................. 250/201 |
| 4,716,282 A | | 12/1987 | Akashi et al. ............... 250/201 |
| 4,728,785 A | | 3/1988 | Ohnuki et al. .............. 250/201 |
| 4,739,157 A | | 4/1988 | Akashi et al. ............... 250/201 |
| 4,774,539 A | | 9/1988 | Suda et al. .................. 354/406 |
| 4,792,668 A | | 12/1988 | Akashi et al. ............... 250/201 |
| 4,792,669 A | | 12/1988 | Ohnuki et al. .............. 250/201 |
| 4,800,410 A | | 1/1989 | Akashi et al. ............... 354/408 |
| 4,808,808 A | * | 2/1989 | Karasaki et al. ......... 250/201.2 |
| 4,812,869 A | | 3/1989 | Akashi et al. ............... 354/408 |
| 4,825,239 A | | 4/1989 | Suda et al. .................. 354/402 |
| 4,833,313 A | | 5/1989 | Akashi et al. ............... 250/201 |
| 4,855,777 A | | 8/1989 | Suda et al. .................. 354/402 |
| 4,859,842 A | | 8/1989 | Suda et al. .................. 250/201 |

(Continued)

FOREIGN PATENT DOCUMENTS

JP  5-88445  12/1993

OTHER PUBLICATIONS

S. Mendis, et al., "CMOS Active Pixel Image Sensor," IEEE Transactions on Electron Devices, vol. 41, No. 3, Mar. 1994, pp. 452–453.

*Primary Examiner*—Wendy R. Garber
*Assistant Examiner*—Kelly L. Jerabek
(74) *Attorney, Agent, or Firm*—Fitzpatrick, Cella, Harper & Scinto

(57) ABSTRACT

A focus detecting device comprises a first photoelectric conversion section for performing photoelectric conversion of a light beam emitted from a first pupil area of a image pickup optical unit, a second photoelectric conversion section for performing photoelectric conversion of a light beam emitted from a second pupil area different from the first pupil area, a light intercepting section having openings for allowing passage of a portion of light in the first pupil area and for allowing passage of a portion of light in the second pupil area, and a detecting section for detecting a focus condition of the image pickup optical unit on the basis of photoelectric conversion outputs of the first photoelectric conversion means and the second photoelectric conversion sections. For example, when the image pickup optical unit has a large defocus quantity, the light intercepting section is set in an optical path for focus detection.

20 Claims, 21 Drawing Sheets

U.S. PATENT DOCUMENTS

| | | | | |
|---|---|---|---|---|
| 4,878,078 A | | 10/1989 | Koyama et al. | 354/402 |
| 4,908,645 A | | 3/1990 | Higashihara et al. | 354/402 |
| 4,914,282 A | | 4/1990 | Akashi et al. | 250/201.8 |
| 4,954,701 A | | 9/1990 | Suzuki et al. | 250/201.8 |
| 4,959,677 A | | 9/1990 | Suda et al. | 354/402 |
| 4,963,912 A | | 10/1990 | Suda et al. | 354/404 |
| 4,992,817 A | | 2/1991 | Aoyama et al. | 354/403 |
| 4,992,819 A | | 2/1991 | Ohtaka et al. | 354/408 |
| 5,005,041 A | | 4/1991 | Suda et al. | 354/407 |
| 5,091,742 A | | 2/1992 | Fukahori et al. | 354/402 |
| 5,258,804 A | | 11/1993 | Suda | 354/406 |
| 5,264,890 A | * | 11/1993 | Komiya | 396/101 |
| 5,367,153 A | | 11/1994 | Suda et al. | 250/201.8 |
| 5,440,367 A | | 8/1995 | Suda | 354/402 |
| 5,473,403 A | | 12/1995 | Suda et al. | 354/409 |
| 5,485,209 A | * | 1/1996 | Muramoto et al. | 348/349 |
| 5,678,097 A | | 10/1997 | Suda | 396/113 |
| 5,771,413 A | | 6/1998 | Suda et al. | 396/114 |
| 5,784,655 A | * | 7/1998 | Akashi et al. | 396/128 |
| 5,839,001 A | | 11/1998 | Ohtaka et al. | 396/114 |
| 5,864,721 A | | 1/1999 | Suda et al. | 396/114 |
| 6,097,894 A | | 8/2000 | Suda | 396/51 |
| 6,108,036 A | * | 8/2000 | Harada et al. | 348/219.1 |
| 6,181,378 B1 | * | 1/2001 | Horie et al. | 348/353 |
| 6,473,126 B1 | * | 10/2002 | Higashihara et al. | 348/345 |
| 6,597,868 B2 | * | 7/2003 | Suda | 396/111 |
| 6,618,087 B1 | * | 9/2003 | Hokari et al. | 348/311 |
| 6,700,615 B1 | * | 3/2004 | Satoh | 348/345 |
| 6,781,632 B1 | * | 8/2004 | Ide | 348/345 |
| 6,819,360 B1 | * | 11/2004 | Ide et al. | 348/340 |
| 6,829,008 B1 | * | 12/2004 | Kondo et al. | 348/302 |
| 2001/0045989 A1 | * | 11/2001 | Onuki | 348/345 |

* cited by examiner

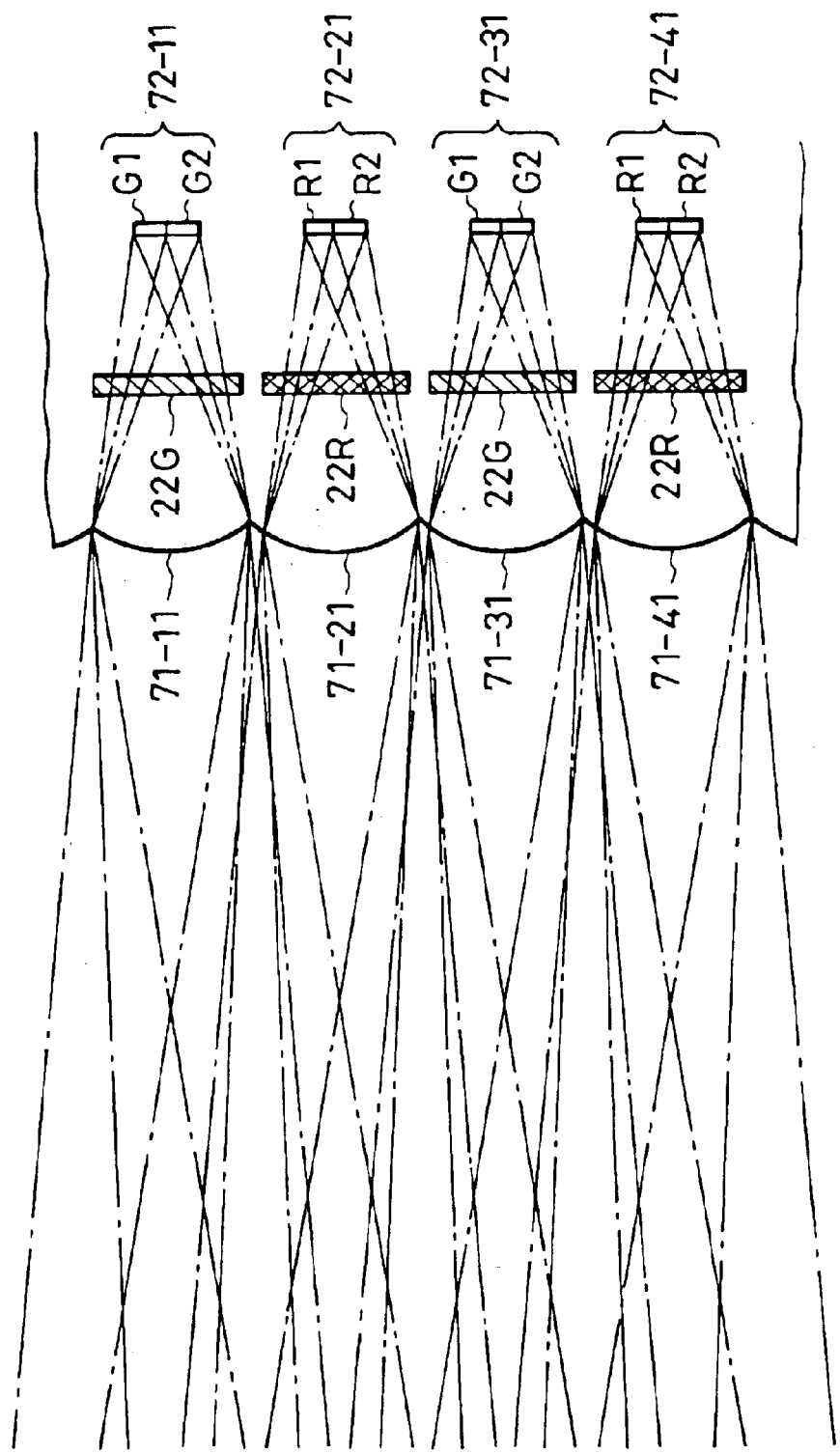

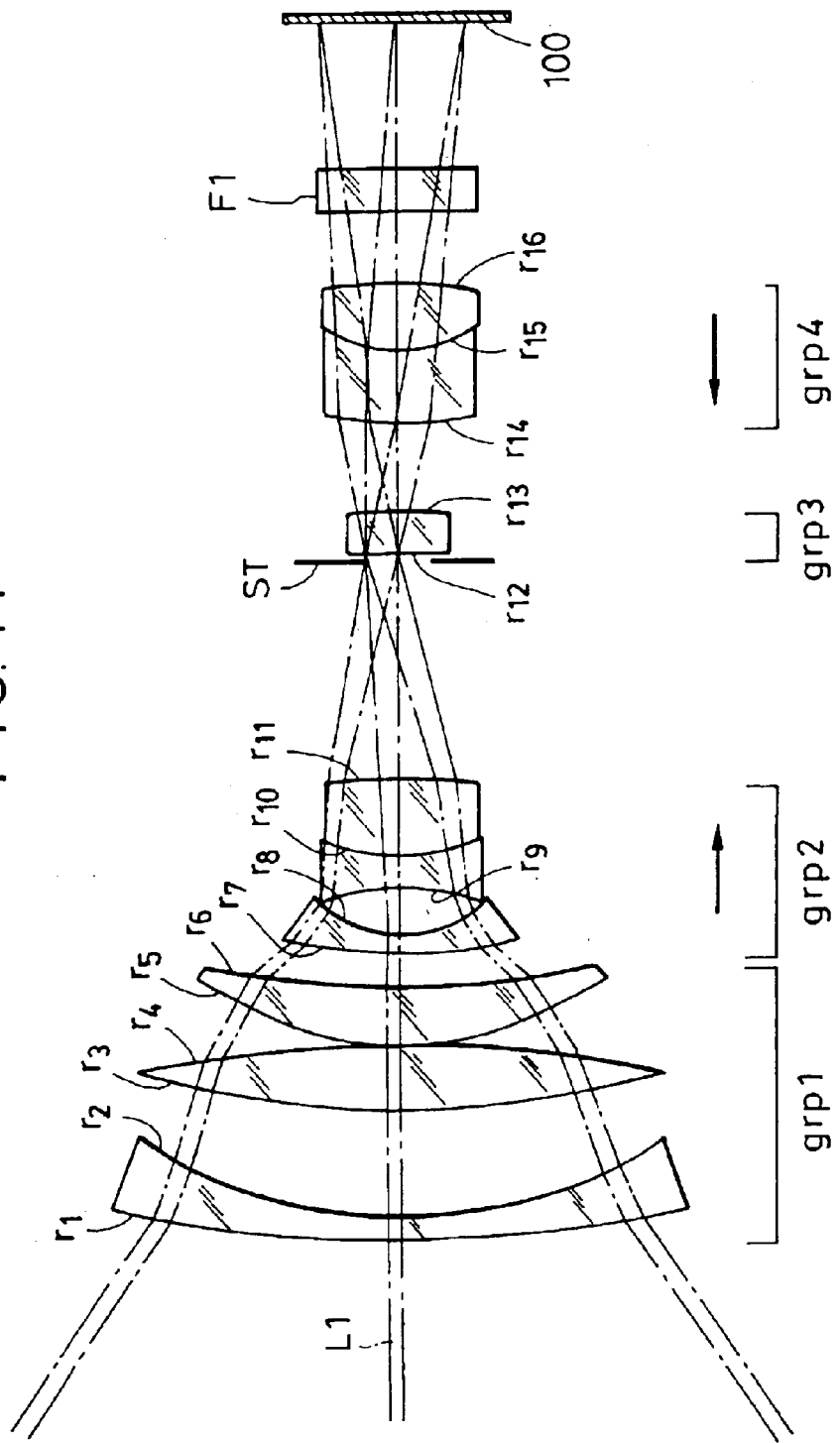

FOCUS DETECTING DEVICE WITH PHOTOELECTRIC CONVERSION PORTION HAVING MICROLENS AND WITH LIGHT BLOCKING PORTION HAVING FIRST AND SECOND OPENINGS

BACKGROUND OF THE INVENTION

1. Field of the Invention

The present invention relates to improvement of a focus detecting device for use in film cameras, digital color cameras and other cameras, and further to improvement of an image pickup (imaging) unit internally including the same focus detecting device.

2. Description of the Related Art

In digital color cameras, in response to depression of a release button, a solid-state image pickup element such as a CCD or a CMOS sensor is exposed to a field image for a desired period of time, and an image signal representative of a still image in one image plane is converted into a digital signal and is subjected to predetermined image signal processing such as YC processing to obtain an image signal of a predetermined format.

The digital image signal indicative of the image picked up is recorded in a semiconductor memory according to frame image. The image signal recorded is, as occasion calls, read out to be displayed, or reproduced into a printable signal and outputted to a monitor or the like to be displayed.

In a case in which the image signal picked up is displayed as an image in the real time, the image signal can be displayed instead of being stored in the semiconductor memory, and it can be displayed as an image varying dynamically at all times. On the other hand, for the display of a still image, the image signal is temporarily stored in a semiconductor memory such as VRAM and is read out from that semiconductor memory to be displayed as a still image in a monitor such as a liquid crystal display. Accordingly, in a case in which a plurality of still images are taken and reproduced/displayed or printed afterwards, the image signal is temporarily stored as a VRAM image signal in an erasable-type program ROM such as a flash memory or an EEPROM, a memory stick, a memory card or the like, with the VRAM image signal being stored semipermanently in a semiconductor memory, a memory tape or the like.

However, in the case of a digital color camera offering a high-quality image, a need for more important factors exists at the image pickup. That is, as the factors, there are a focus detecting means at the image pickup and the lens alignment for placing the focus on a subject.

So far, a digital color camera has employed a contrast detection type focus detecting device. The contrast detection type obtains the sharpness of an object image, formed through an image pickup optical system, by evaluating an output of a solid-state image pickup element on the basis of a predetermined function for adjusting the position of the image pickup optical system on the optical axis so that the function value assumes a maximum value. Among the evaluation functions, for example, there are a function that adds the absolute value of the difference between the adjacent luminance signals in a focus detecting area, a function that adds the square of the difference between the adjacent luminance signals in a focus detecting area and a function that similarly processes the difference between the adjacent signals at the level of each of R, G and B image signals.

In general, in such a contrast detection type focus detecting device, since the evaluation function is obtained while the position of the image pickup optical system on the optical axis is shifted bit by bit, the time for the evaluation function processing becomes necessary, and the focusing operation takes time until the in-focus condition is reached.

In addition, as disclosed in U.S. Pat. No. 4,410,804, there has been known an image pickup unit incorporating the so-called phase difference detection type focus detecting device in which one pair of or two pairs of light-receiving sections are provided according to two-dimensionally arranged microlens array to divide a pupil of an image pickup optical system by projecting the light-receiving sections on the pupil through the microlenses. The phase difference type forms object images through the use of two light beams passing through different portions of a pupil of an image pickup optical system for detecting the positional phase difference between the two object images on the basis of outputs of image pickup elements to convert the detected positional phase difference into a defocus quantity of the image pickup optical system.

Since the phase difference detection type focus detecting device is capable of detecting the defocus quantity, it can considerably shorten the time taken until the in-focus condition is reached, as compared with the contrast detection type.

A solid-state image pickup element with the structure disclosed in U.S. Pat. No. 4,410,804 employs a microlens array to form one pair of or two pairs of images through the use of a light beam passing through a portion of a pupil of the image pickup optical system. The power of each microlens is set so the each of the light-receiving sections of the image pickup element is projected to an exit pupil of the image pickup optical system 24, while each light-receiving section of the image pickup element and the exit pupil are in conjugate relation to each other.

In this case, for establishing linear relationship between the light quantity incident on the light-receiving sections and the opening degree (aperture) of the diaphragm (iris) of the image pickup optical system, the projection magnification may be selected so that a projected image on each light-receiving section is larger than the exit pupil at the release of the diaphragm of the image pickup optical system. Thus, knowing the subject luminance and the sensitivity of the image pickup element, the lens (diaphragm) opening degree and the shutter speed are calculable in the same manner as that for a film camera. That is, the incident light quantity shows proportional relation to the opening area, which satisfies the calculation according to the APEX mode (Additive System of Photographic Exposure).

However, the defocused condition creates a problem in that, since the configuration of the pupil divided is superimposed on a blurred image, difficulty is encountered in detecting a large-defocus condition.

In addition, in this mode, as another factor to increase the detection error on the defocus quantity, there is an error resulting from manufacturing of the microlens. As mentioned above, the microlens projects a light-receiving section to the exit pupil of the image pickup optical system. Assuming that the projection position is different according to pixel, the phase shift quantity at the defocus varies according to pixel. This provides a larger effect as the defocus quantity increases. However, the microlens has a very fine structure; therefore, in fact, the difference among the microlenses stemming from the manufacturing may be compromised to some degree.

SUMMARY OF THE INVENTION

Accordingly, it is a first object of the present invention to provide a phase difference detection type focus detecting device for use in an image pickup unit, which is constructed so that the incident light on an image pickup element is approximately proportional to an opening area of a diaphragm and which is capable of detecting a large defocus.

A second object of the invention is to provide a phase difference detection type focus detecting device for use in an image pickup unit, which is capable of accepting a certain degree of error stemming from manufacturing of a microlens to be used in an photoelectric conversion element.

In accordance with a feature of the invention, a focus detecting device for use in an image pickup optical unit comprises first photoelectric conversion means for performing photoelectric conversion of a light beam emitted from a first pupil area of the image pickup optical unit, second photoelectric conversion means for performing photoelectric conversion of a light beam emitted from a second pupil area different from the first pupil area, light intercepting means having openings for allowing passage of a portion of light in the first pupil area and for allowing passage of a portion of light in the second pupil area, and detecting means for detecting a focus condition of the image pickup optical unit on the basis of photoelectric conversion outputs of the first photoelectric conversion means and the second photoelectric conversion means.

The light intercepting means is detachable with respect to an optical path of the image pickup optical unit.

In addition, the first photoelectric conversion means has a plurality of photoelectric conversion elements while the second photoelectric conversion means has photoelectric conversion elements each adjacent to each of the photoelectric conversion elements of the first photoelectric conversion means, with microlens means being located in front of said photoelectric conversion element of the first photoelectric conversion means and the photoelectric conversion element of the second photoelectric conversion means adjacent thereto.

Still additionally, color filter means is placed in front of the photoelectric conversion elements.

Moreover, the light intercepting means is set in an optical path of the image pickup optical unit at the focus detection by the detecting means.

Still moreover, a signal processing circuit is provided which produces an image signal by adding a photoelectric conversion signal from the first photoelectric conversion means and a photoelectric conversion signal from the second photoelectric conversion means.

Other features of the present invention will become more readily apparent from the following detailed description of the preferred embodiments taken in conjunction with the accompanying drawings.

Further objects, features and advantages of the present invention will become apparent from the following description of the preferred embodiments (with reference to the attached drawings).

BRIEF DESCRIPTION OF THE DRAWINGS

FIG. 9 is a cross-sectional view showing an area sensor section according to the invention;

FIG. 11 is an illustration of a light beam incident on a second photoelectric conversion section, according to the invention;

FIG. 17A is an illustration for describing a case in which pixels are read out in vertical line sequence, FIG. 17B is a timing chart in a case in which storage times are substantially equal to each other, FIG. 17C is a timing chart in a case of shortening electric charge storage time, and FIG. 17D is a timing chart in a case in which a signal level of a second line is different from that of other lines;

DESCRIPTION OF THE PREFERRED EMBODIMENTS

Embodiments of the present invention will be described hereinbelow with reference to the drawings.

[First Embodiment]

First of all, a description will be given hereinbelow of an image pickup optical system for use in a first embodiment of the invention.

Figure 1:
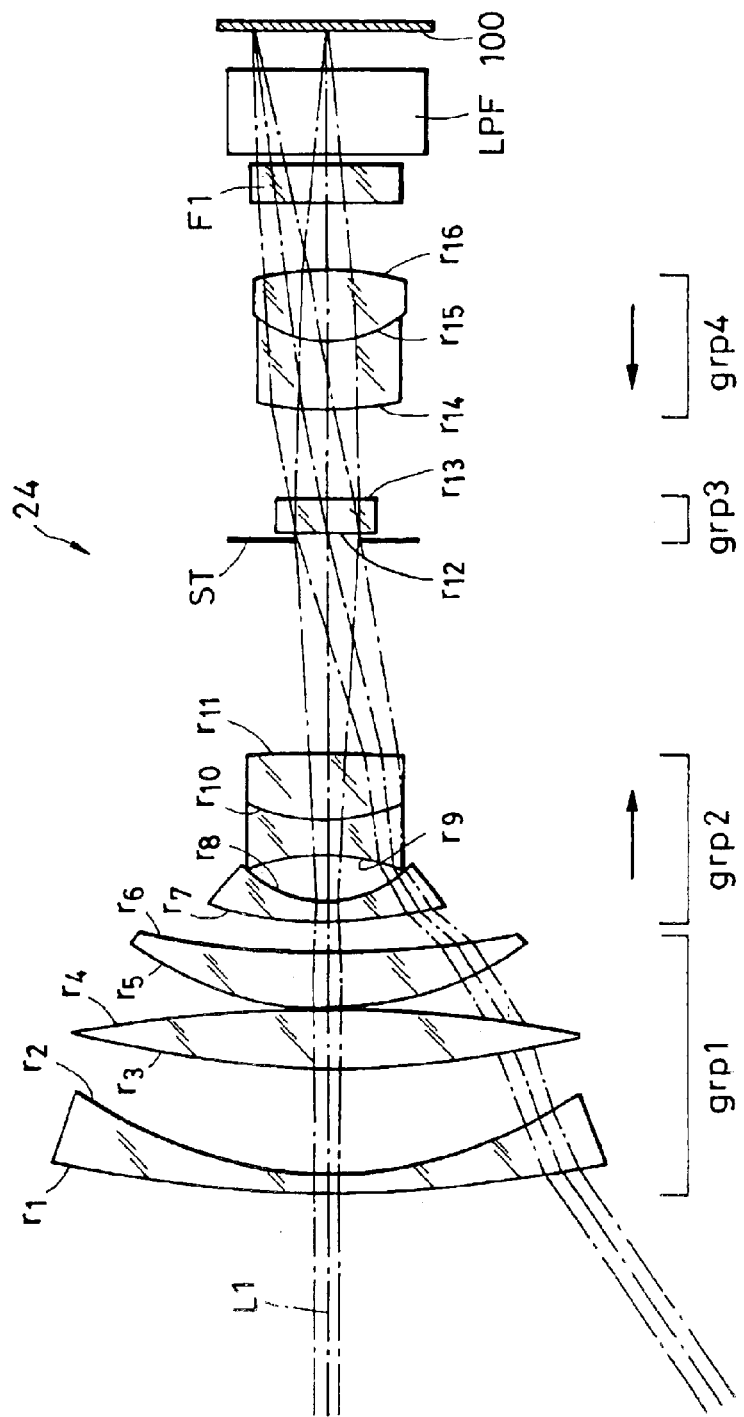
FIG. 1 is an illustration of a construction of an image pickup optical system according to the present invention.

FIG. 1 is an illustration of a construction of an image pickup optical system according to the invention, showing a zoom optical system of a digital color camera using a solid-state image pickup element. In this illustration, the left side shows a subject side while the right side illustrates an image plane side.

In the illustration, the image pickup optical system, designated generally at reference numeral 24, is made up of a positive first group (grp1) comprising a negative lens having lens surfaces r1 and r2, a positive lens having lens surfaces r3 and r4 and a positive lens having lens surfaces r5 and r6, a negative second group (grp2) comprising negative and positive lenses having lens surfaces r9, r10 and r11, a diaphragm ST, a positive third group (grp3) comprising a positive lens having lens surfaces r12 and r13, and a fourth group (grp4) comprising negative and positive lenses having lens surfaces r14, r15 and r16. Additionally, reference mark F1 represents an infrared (IR) cut filter, reference mark LPF denotes an optical low-pass filter, reference numeral 100 depicts an image pickup element having an image pickup plane in which image pickup elements are arranged two-dimensionally, and reference mark L1 signifies an optical axis of the image pickup optical system 24.

In addition, as indicated by arrows in FIG. 1, as the focal length varies from the wide-angle side to the telephoto side in accordance with a zooming operation, the negative second group grp2 shifts to the image plane (100) side and the positive fourth group grp4 shifts to the subject side, with the negative second group grp2 and the positive fourth grp4 moving simultaneously in opposite directions.

The image pickup optical system 24 includes a lens drive mechanism (not shown) to move the negative second group grp2 in the optical-axis directions through the use of a motor and a gear for focusing, thereby producing an in-focus state of an object image on the image pickup element 100.

Figure 2:
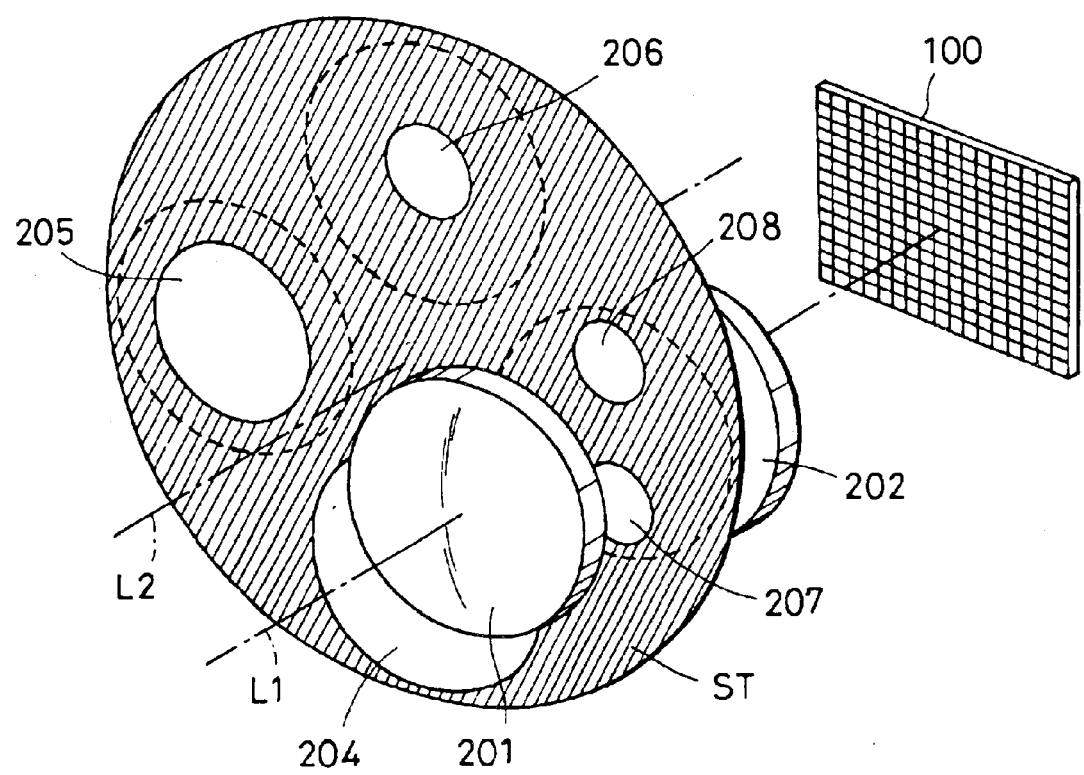
FIG. 2 is a perspective view showing an image pickup unit according to the invention.

FIG. 2 is a perspective view showing the image pickup unit. In the illustration, numeral 201 designates, of the image pickup optical system 24, a front lens group collectively representing the first group (grp1) and the second group (grp2) existing on the object side with respect to the diaphragm ST, numeral 202 represents, of the image pickup optical system 24, a rear lens group collectively representing the third group (grp3), the fourth group (grp4) and the optical low-pass filter LPF existing on the image plane side with respect to the diaphragm ST, with a light beam passing through the aperture (opening) of the diaphragm ST forming an object image on the image pickup element 100. The diaphragm ST is rotatable around an axis L2, and selectively takes four positions at an interval of 90 degrees owing to a driving force of a motor (not shown). Additionally, the diaphragm ST has five apertures designated at reference numerals 204 to 208, of which the apertures 204, 205 and 206 are for the image pickup, and the apertures 207 and 208 are for a large-defocus detection.

Secondly, a description will be given hereinbelow of the image pickup element 100 according to the invention.

The image pickup element 100 is a CMOS process compatible photoelectric conversion sensor (which will be referred to hereinafter as a "CMOS sensor"). This type of sensor has been published in the documents such as "IEEE TRANSACTIONS OF ELECTRON DEVICE, VOL41, PP452–453, 1994".

One feature of the CMOS sensor is a considerable decrease in the numbers of masks and processes in comparison with the case of a CCD, because MOS transistors for light-receiving sections and MOS transistors for peripheral circuits such as vertical/horizontal scanning circuits, shading correction circuit, a clamp circuit, an A/D converter and a signal processing circuit can be formed in the same process.

The present invention makes use of this feature, and two photoelectric conversion sections are made in one pixel and, unlike a conventional art in which a floating diffusion area (which will be referred to hereinafter as an "FD area") and a source follower amplifier are provided according to photoelectric conversion section, one FD area and one source follower amplifier are formed with respect to two photoelectric conversion sections, with two photoelectric conversion areas being connected through a transfer MOS transistor switch to that FD area.

Accordingly, the electric charge in the two photoelectric conversion sections can be transferred simultaneously or separately to a floating diffusion section, and it is possible to simply add or non-add the signal electric charge of the two photoelectric conversion sections according to the timing of the transfer MOSS transistor. The use of this arrangement enables the switching between a first output mode in which a photoelectric conversion output is made using a light beam from the entire exit pupil of an image pickup optical system and a second output mode in which an photoelectric conversion is made using a light beam from a portion of an exit pupil of an image pickup lens. In the first output mode in which the addition is made in terms of pixel, a less-noise signal is obtainable as compared with a mode in which the addition is made after the readout of a signal.

Figure 3:
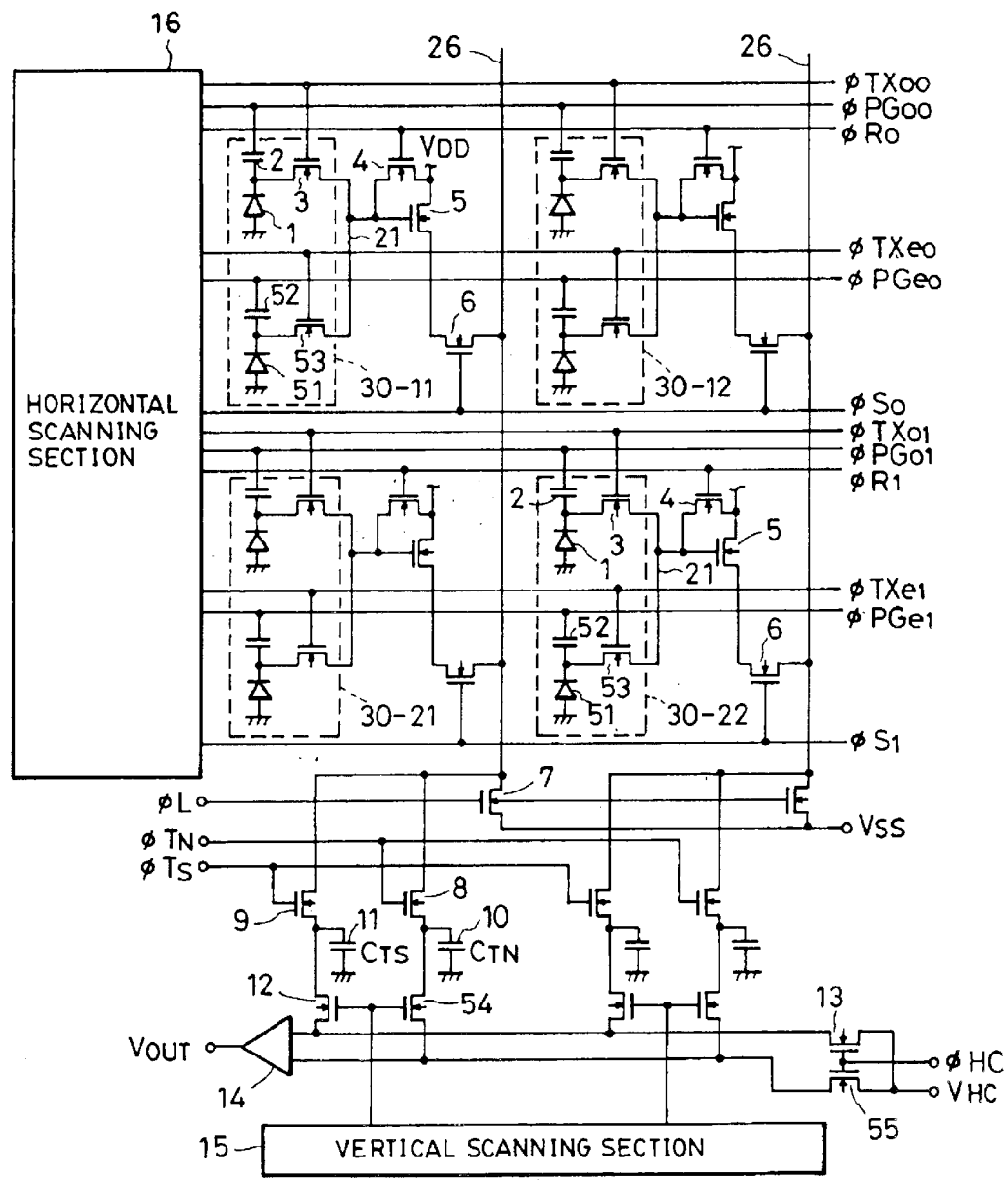
FIG. 3 is an illustration of a circuit arrangement of an area sensor section in an image pickup element according to the invention.
Figure 4:
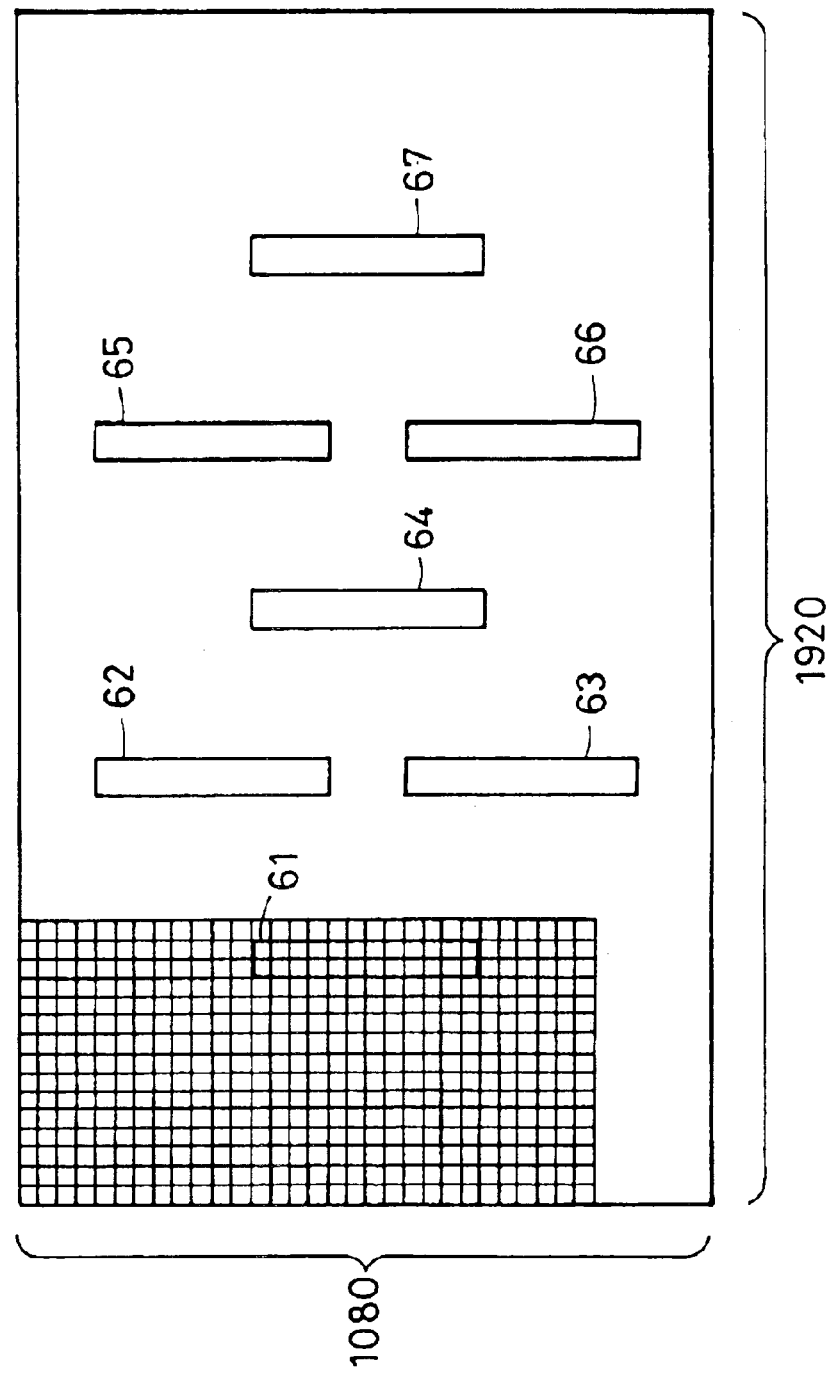
FIG. 4 is an illustration useful for explaining an image pickup area and a focus detecting area according to the invention.

FIG. 3 is an illustration of a circuit arrangement of an area sensor section in the image pickup element 100. Although this illustration shows a two-dimensional area sensor of two columns×two rows, in fact, as shown in FIG. 4, the number of pixels is increased such that, for example, 1920 columns× 1080 rows, thus providing a practical resolution. Incidentally, reference numerals 61 to 67 in FIG. 4 signify focus detecting areas which will be described later. The focus detecting areas are arranged vertically to easily understand a luminance distribution within an vertically elongated object such as a person in a subject.

In FIG. 3, reference numerals 1 and 51 denote photodiode-like first and second photoelectric conversion sections each comprising a MOS transistor gate and a depletion layer under the gate, numerals 2 and 52 depict photogates indicated by a symbol of a capacitor in the illustration, numerals 3 and 53 represent transfer switch MOS transistors for transferring the electric charge due to the photoelectric conversion of the first and second photoelectric conversion sections 1 and 51, numeral 4 designates a reset MOS transistor for resetting the electric charge of a floating diffusion section FD, numeral 5 signifies a source follower amplifier MOS transistor for converting the electric charge in the floating diffusion section FD into a voltage in a source follower mode for amplification, numeral 6 designates a vertical selection switch MOS transistor for selecting pixels in accordance with a pulse $\phi S0$ from a horizontal scanning section 16, numeral 7 indicates a load MOS transistor constituting a load of the source follower amplifier MOS transistor 5 for the amplification in the source follower mode, numeral 8 denotes a dark output transfer MOS transistor for transferring dark electric charge of the floating diffusion section FD, numeral 9 depicts a light output transfer MOS transistor for transferring, as a light output, the accumulated electric charge of the floating diffusion section FD at the image pickup, numeral 10 designates a dark output accumulation capacitor $C_{TN}$ for accumulating (storing) the dark output when the dark output transfer MOS transistor 8 turns on, numeral 11 represents a light output accumulation capacitor $C_{TS}$ for accumulating the dark output when the light output transfer MOS transistor 9 turns on, numerals 12 and 54 indicate vertical transfer MOS transistors which turn on/off in accordance with a control pulse from a vertical scanning section 15, numerals 13 and 55 indicate vertical output line reset MOS transistors for resetting a vertical output line, numeral 14 denotes a differential output amplifier for outputting a difference between a light output and a dark output, numeral 15 designates a vertical scanning section for outputting a pulse for controlling the vertical transfer MOS transistors 12 and 54, and numeral 16 denotes a horizontal scanning section for outputting a reset pulse, a trigger pulse, a selection pulse and a transfer pulse for reading out the electric charge of the first and second photoelectric conversion sections 1 and 51.

Figure 5:
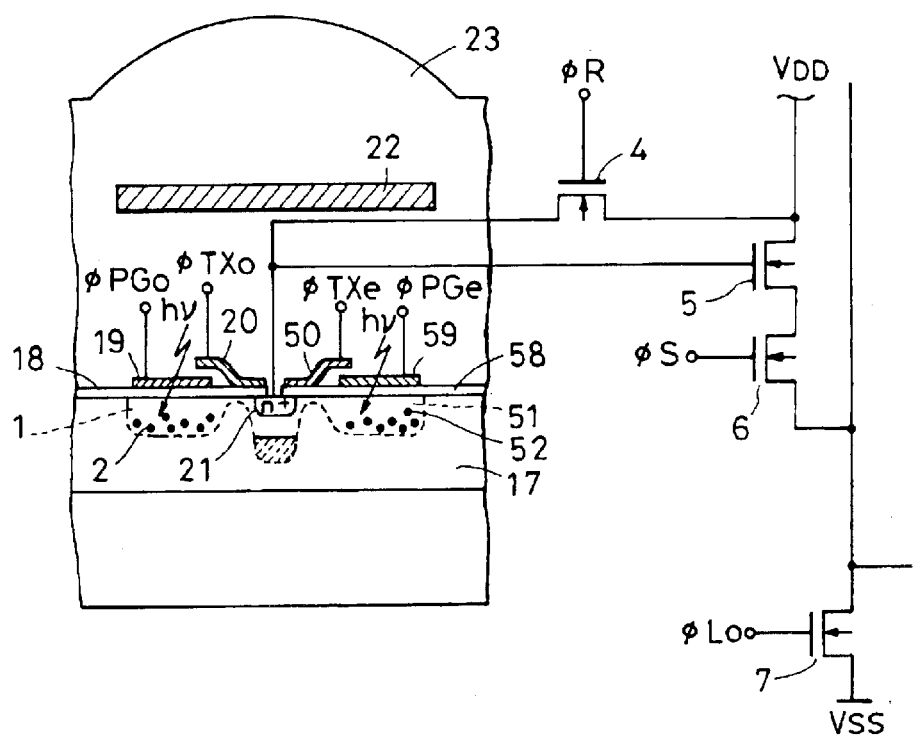
FIG. 5 is a cross-sectional view showing a light-receiving section according to the invention.

FIG. 5 is a cross-sectional view showing a structure of a light-receiving section (for example, 30-11 in FIG. 3). The other light-receiving sections (for example, 30-21, 30-12, 30-22) have the same structure.

In FIG. 5, reference numeral 17 represents a P-type well, numerals 18 and 58 designate gate oxide films, numerals 19 and 59 depict first-layer poly-Si, numerals 20 and 50 denote second-layer poly-Si, and numeral 21 indicates an n$^+$ floating diffusion area. The same parts as those in FIG. 3 are marked with the same reference numerals. For example, the same parts are the first and second photoelectric conversion sections 1 and 51, the photogates 2 and 52, the reset MOS transistor 4, the source follower amplifier MOS transistor 5, the vertical selection switch MOS transistor 6 and the load MOS transistor 7.

The FD area 21 is connected through the transfer MOS transistors 3 and 53 to the first photoelectric conversion section 1 and the second photoelectric conversion section 51. In FIG. 5, although the first photoelectric conversion section 1 and the second photoelectric conversion section 51 are shown in a state separated from each other, the boundary portion therebetween is extremely small in fact, and in practical use, the first photoelectric conversion section 1 and the second photoelectric conversion section 51 can be considered to be brought into contact with each other. The first photoelectric conversion section 1 and the second photoelectric conversion section 51 will hereinafter be referred to collectively as a "light-receiving section".

Furthermore, numeral 22 represents a color filter for allowing the passage of light in a specified wavelength region, numeral 23 designates a microlens for efficiently leading a light beam from the image pickup optical system 24 to the first and second photoelectric conversion sections.

Figure 6:
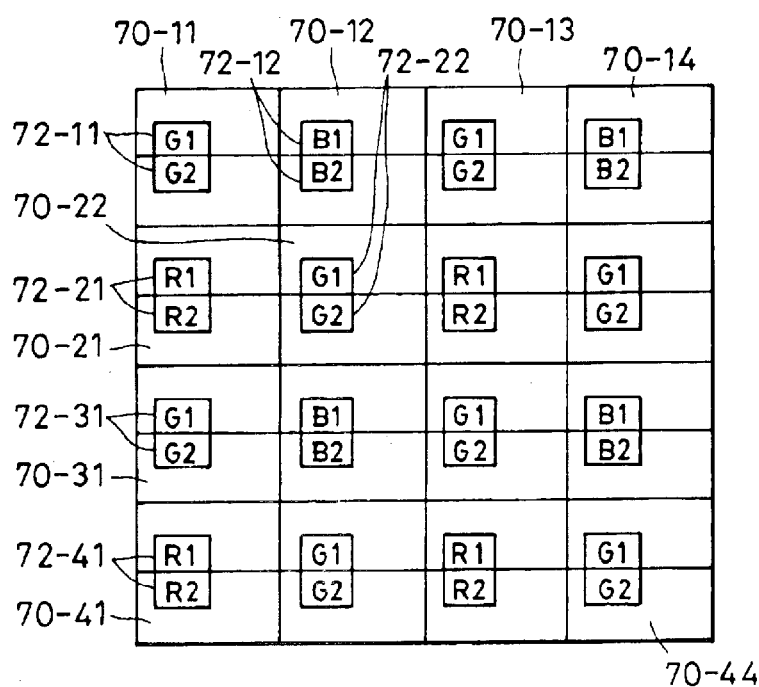
FIG. 6 is a plan view showing location of pixels and color filters according to the invention.

FIG. 6 is a plan view showing a layout of pixels and color filters. In the illustration, only a layout of four rows×four columns is shown partially. The pixels each including a light-receiving section and a MOS transistor are substantially laid out into a square, and are latticed in a state adjacent to each other. The light-receiving sections 30-21, 30-22, 30-11 and 30-12 described above with reference to FIG. 3 are located in the pixels 70-11, 70-21, 70-12 and 70-22 and, in FIG. 6, are expressed as area sensors 72-11, 72-21, 72-12 and 72-22. Additionally, each pixel 70 includes the light-receiving section 30, the reset MOS transistor 4, the source follower amplifier MOS transistor 5 and the vertical selection switch MOS transistor 6.

In the pixels, the area sensor sections 72 are arranged to form the so-called Bayer pattern in which four pixels constitute one set, with R (red), G (green) and B (blue) color filters 22 being alternately located and a microlens 23 being placed on each of the color filters 22. In the Bayer pattern, more G pixels (which the viewer is greatly sensitive to when viewing an image) are placed than R or B pixels, to wholly enhance the visual image performance. In general, with an image pickup element in this mode, luminance signals are generated from the G pixels while color signals are produced from the R, G and B pixels.

As mentioned above, one pixel has two photoelectric conversion sections. In FIG. 6, characters R, G and B denote the photoelectric conversion sections with red, green and blue color filters, respectively, while numerals 1 and 2 subsequent to R, G and B depict the first photoelectric conversion section and the second photoelectric conversion section, respectively. For example, R1 represents the first photoelectric conversion with the red color filter, while G2 signifies the second photoelectric conversion section with the green color filter.

Furthermore, in each pixel, the light-receiving section contributes approximately several tens percents, and the so-called aperture reaches approximately several tens percents. Thus, for effectively utilizing a light beam emitted from the image pickup optical system 24, there is a need to use a condensing lens for each of the light-receiving sections for deflecting light, directed to other than the light-receiving section, to the light-receiving section.

Figure 7:
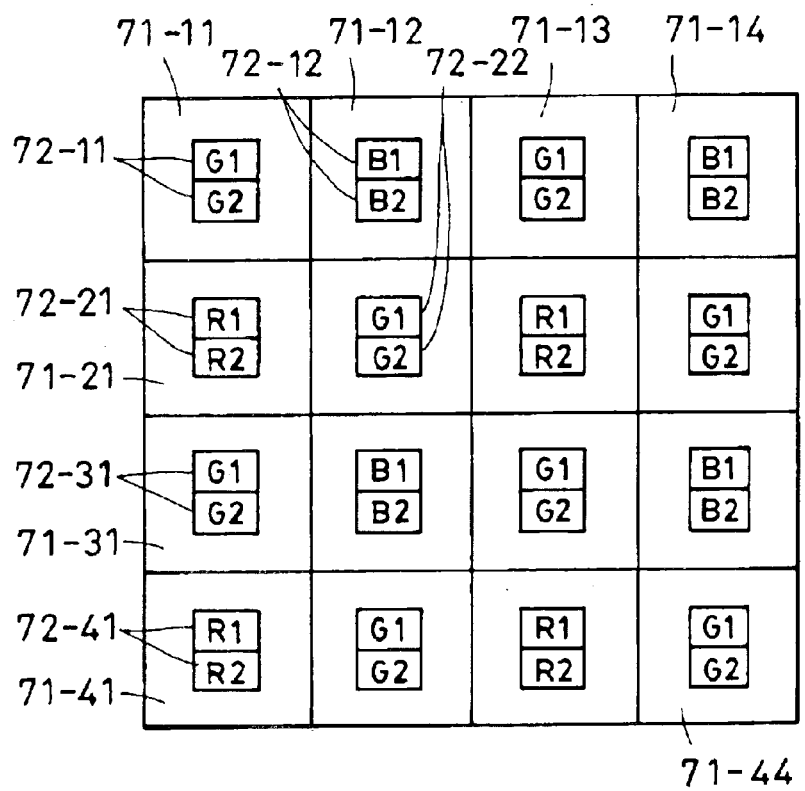
FIG. 7 is a plan view showing the positional relationship between a microlens and a light-receiving section according to the invention.
Figure 8:
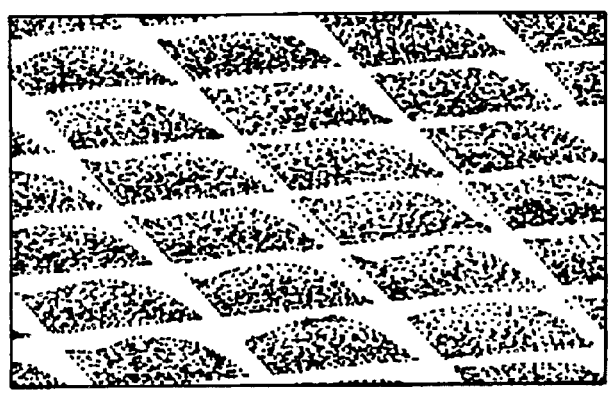
FIG. 8 is an illustration of a surface condition of a microlens viewed from an oblique direction, according to the invention.

FIG. 7 is a plan view showing the positional relationship between microlenses placed in front of the image pickup element and the light-receiving sections. Each of the microlenses 71-11 to 71-44 is an axisymmetric spherical lens or aspherical lens in which its optical axis coincides approximately with the center of the corresponding light-receiving section, and they have a rectangular effective portion and are arranged closely into a lattice-like configuration in a state where their light incidence sides form a convex. FIG. 8 is an illustration of a surface state of the microlenses viewed from an oblique direction. Each of the microlenses is formed with respect to a pair of first and second photoelectric conversion sections, and they are formed into an X-Y matrix configuration to efficiently condense light for converging a subject image.

Secondly, a detailed description will be given hereinbelow of a function of the microlens.

FIG. 9 is a cross-sectional view showing an area sensor section. The image pickup optical system 24 stands on the left side in the illustration, and a light beam emitted from the image pickup optical system 24 passes through the IR cut filter F1 and the optical low-pass filter LPF to reach the microlenses 71-11, 71-21, 71-31 and 71-41. The color filters 22G, 22R, 22G and 22R are placed at the rear of the microlenses 71-11, 71-21, 71-31 and 71-41, respectively, to select only desired wavelength regions, and the light beam then reaches the light-receiving sections 72-11 to 72-41. The color filters 22 of three types R, G and R are disposed to form the Bayer pattern as described above With reference to FIG. 6. Additionally, because of the Bayer pattern, of these color filters 22, two types appear in a cross section. The color filter 22G is a green transmission color filter, while the color filter 22R is a red transmission color filter. Still additionally, in other cross sections in row or column directions, a green transmission color filter exists as the color filter 22G while a blue transmission color filter exists as the color filter 22B.

The power, i.e., magnification, of each microlens is set to enable the projection from each of the light-receiving sections of the image pickup element to the exit pupil of the image pickup optical system 24. At this time, the projection magnification is set so that the projected image of the light-receiving section becomes larger than the exit pupil at the release of the diaphragm ST of the image pickup optical system 24, while the light quantity incident on the light-receiving section and the opening degree of the diaphragm ST of the image pickup optical system 24 are set to show a linear relationship. Thus, knowing the subject luminance and the sensitivity of the image pickup element, the diaphragm opening and the shutter speed are calculable in the same manner as that for a film camera. That is, the incident light quantity becomes proportional to the diaphragm opening area to satisfy the calculation according to the APEX mode. Additionally, it is possible to calculate the exposure through the use of a common exposure meter like the film camera, which extremely facilitates the image pickup operation. Thus, a phase difference detection type focus detecting device for use in an image pickup unit can be provided which facilitates the calculation according to the APEX mode, shortens the arithmetic processing time, and further offers the following effects.

Furthermore, since a light beam for the focus detection varies according to the opening of the diaphragm ST, the image pickup light beam and the focus detection light beam coincide with each other at all times, and the in-focus detection result agrees well with the actual best resolution position of the image pickup optical system at the level of aberration. When an object image formed through the image pickup optical system 24 lies on a microlens, the image to be obtained by the image pickup element 100 takes the sharpest condition.

Although the image pickup optical system 24 is preferably of a telecentric type whereby the incidence angle of the main light beam on the image pickup element becomes zero because a high pupil projection accuracy is obtainable through the microlens, difficulty can be experienced in employing a complete telecentric type because of the requirements for size reduction and high zoom magnification. In this case, the centers of the microlens and the light-receiving section are made to be shifted slightly from each other and this decentering quantity is treated as a function of a distance from the optical axis of the image pickup optical system and the light-receiving section. In general, if the shifting quantity is monotonously increased in accordance with the distance, even the light-receiving section around the image plane can correctly be projected onto the exit pupil of the image pickup optical system 24.

Figure 10A:
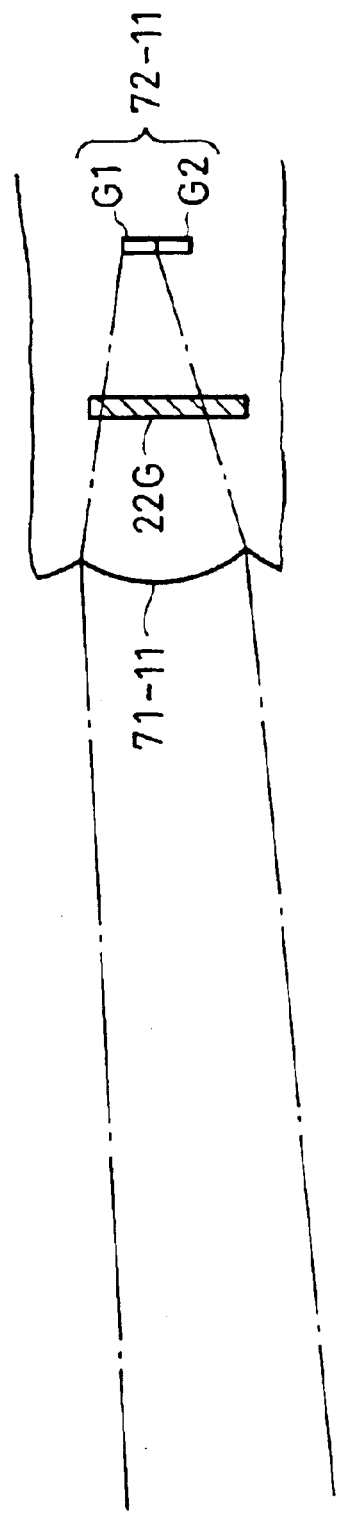
FIGS. 10A and 10B are illustrations of a light beam incident on a first photoelectric conversion section and a light beam incident on a second photoelectric conversion section.
Figure 10B:
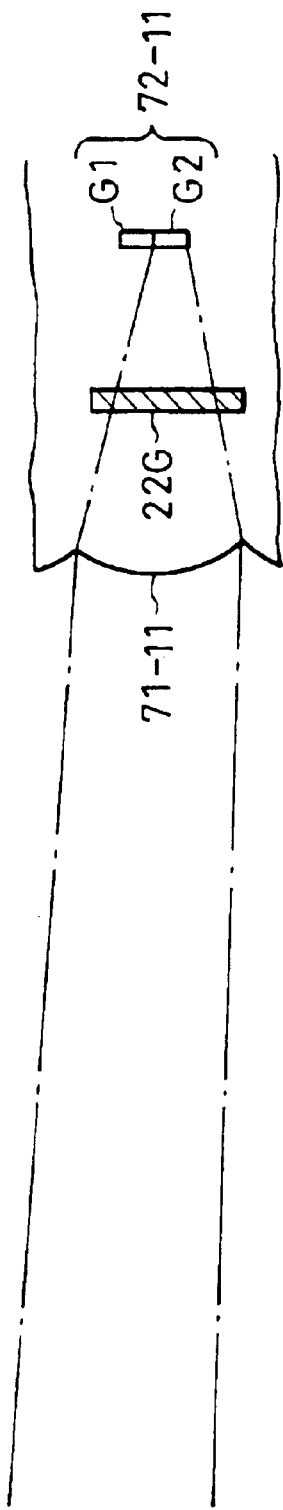

FIGS. 10A and 10B separately show a light beam incident on the first photoelectric conversion section and a light beam incident on the second photoelectric conversion section in the light-receiving section 72-11 in FIG. 9 for an easy understanding of the effect of the microlens providing a focus detecting function. In FIGS. 10A and 10B, the microlens 71-11 is the same as the color filter 22G, and the first photoelectric conversion section G1 and the second photoelectric,conversion section G2 are shown. In FIG. 10A showing the light beam incident on the first photoelectric conversion section, the light beam is incident on the first photoelectric conversion section G1 from a lower side of the illustration, while in FIG. 10B showing the light beam incident on the second photoelectric conversion section G2, the light beam is incident on the second photoelectric conversion section G2 from an upper side of the illustration.

Figure 12:
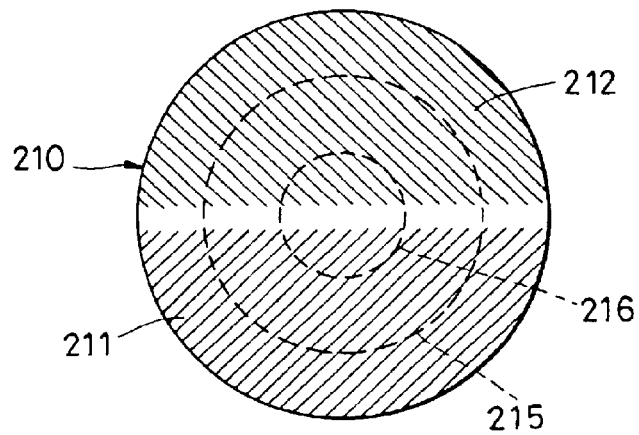
FIG. 12 is an illustration useful for explaining a state of division of an exit pupil according to the invention.

Accordingly, in the entire image pickup element, the light beam incident on the second photoelectric conversion G2 becomes as shown in FIG. 11. The light beam incident on any position of the area sensor section 100 forms a light beam passing through the upper half of the diaphragm ST. On the other hand, in the entire image pickup element of the area sensor section 100, the light beam incident on the first photoelectric conversion section can be considered to be a light beam inverted vertically around the optical axis of the image pickup lens serving as a symmetry axis. That is, the state of division of the exit pupil is as shown in FIG. 12. In the illustration, reference numeral 210 represents an exit pupil of the image pickup optical system 24 when the diaphragm ST is in the open condition 204 shown in FIG. 2, and it is a virtual image appearing when the opening 204 of the diaphragm ST is viewed through the rear lens group 202. Furthermore, in a lower side of the illustration, numeral 211 denotes a first area on the exit pupil through which the light beam incident on the first photoelectric conversion section of the image pickup element 100 passes, while numeral 212 depicts a second area on the exit pupil through which the light beam incident on the second photoelectric conversion section of the image pickup element 100 passes.

In addition, references 215 and 216 designate the exit pupil when the diaphragm ST is in a closing condition, and are virtual images appearing when the openings 205 and 206 of the diaphragm ST are viewed through the rear lens group 202. When the diaphragm ST takes the closing condition, as shown in the case of the openings 207 and 208, the first area 211 and the second area 212 becomes smaller in accordance with the closing condition thereof, and both the image signal obtained from the first photoelectric conversion and image signal obtained from the second photoelectric conversion section are formed by half of the light beam in a case in which the exit pupil of the image pickup optical system 24 is substantially divided into two.

In the above-mentioned optical system, for example, in a case in which an object image is brought into focus in front of the image pickup element 100, a half of the light beam passing through the upper side of the exit pupil is shifted downwardly on the image pickup element 100, while another half of the light beam passing through the lower side of the exit pupil is shifted upwardly. That is, a pair of image signals formed by the light beams respectively passing through the first and second halves of the pupil of the image pickup optical system 24 take conditions in which their phases are shifted in the vertical directions in FIGS. 6, 7 and 9 in accordance with the focusing condition of the object image.

In a case in which image information is obtained through the use of an image pickup element, with respect to a high-frequency component of a spatial luminance distribution on an object, a noise image called "turning noise", having a low frequency different from that frequency, appears due to the discrete image sampling. In a digital color camera, this is the so-called "color breakups". Additionally, in a case of performing the focus detection in the phase difference detection mode by using an output of an image pickup element, the "turning noise" makes it difficult for the phase information on an object image to correctly reflect the image output, which lowers the defocus detection accuracy.

Figure 13:
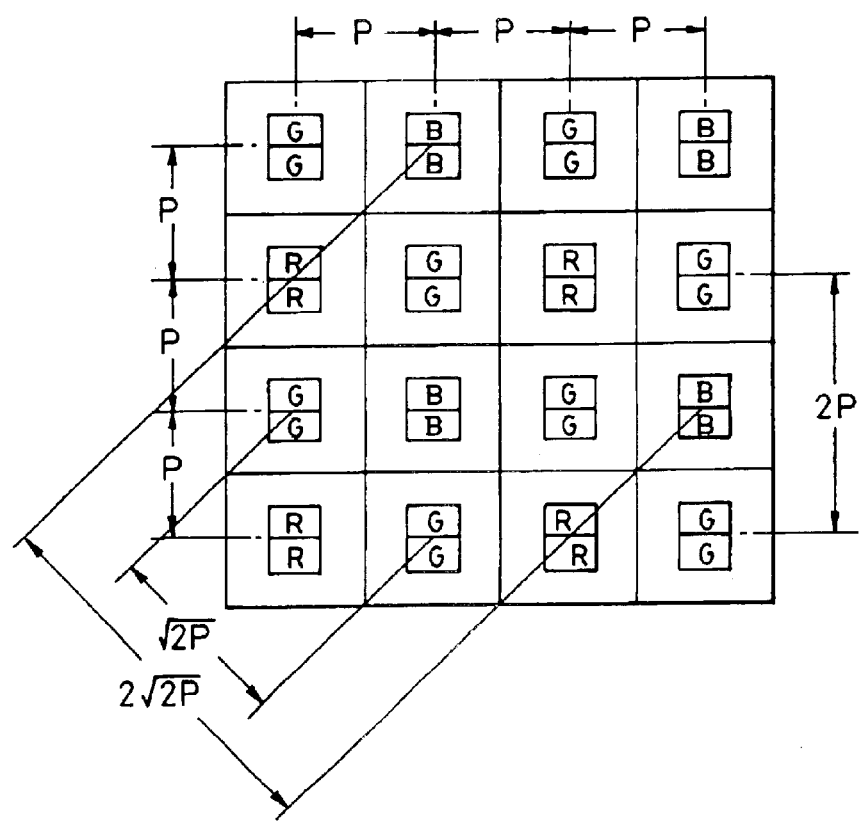
FIG. 13 is an illustration useful for explaining a pitch of pixels according to the invention.

When the pitch of the pixels of the image pickup element 100 to be used in this case is taken as P, as shown in FIG. 13, the pitch of the pixels equipped with a green transmission color filter (G) is 2P in the vertical and horizontal directions and root 2P in diagonal directions, while the pitch of the pixels equipped with a blue transmission color filter (B) and the pitch of the pixels equipped with a red transmission color filter (R) are 2P in the vertical and horizontal directions and 2 root 2p in the diagonal directions. Additionally, each of the pitches of the G pixels, the B pixels and the R pixels in the vertical directions for the focus detection is 2P.

Figure 14:
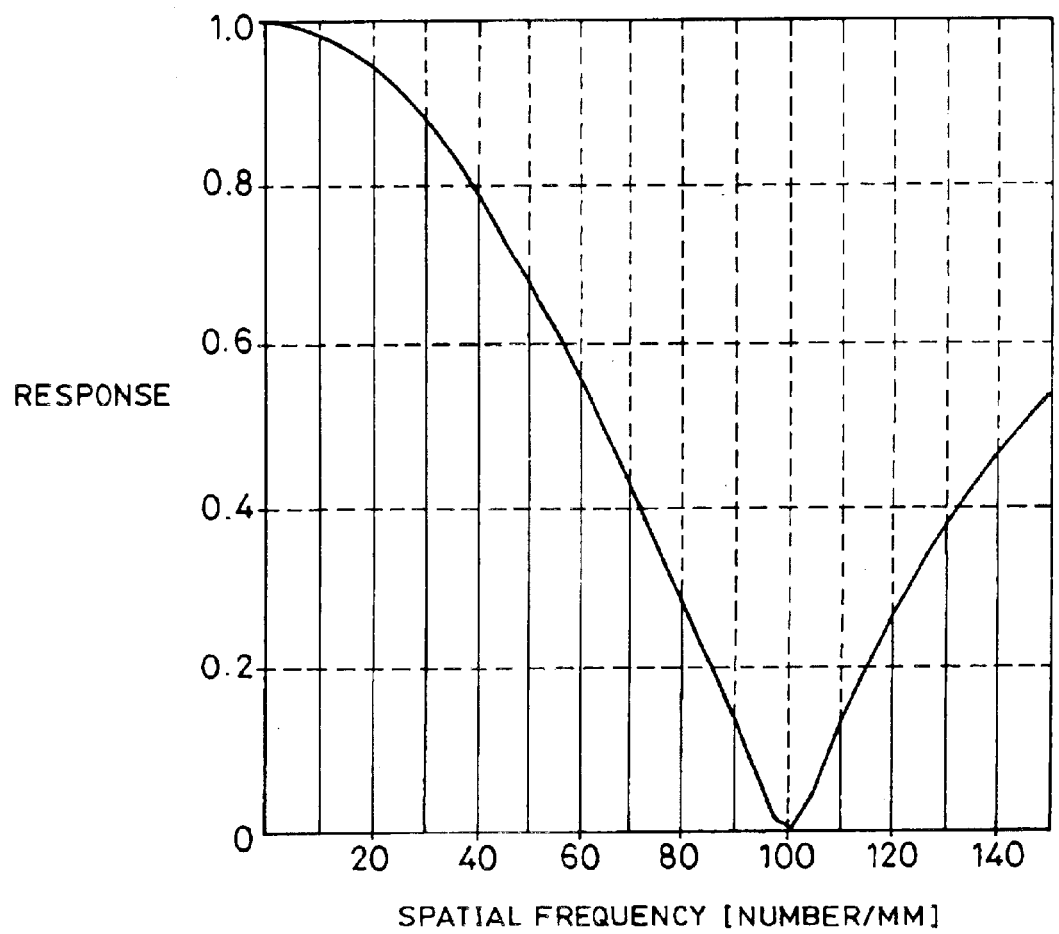
FIG. 14 is an illustration of a response characteristic of an image pickup element according to the invention.

Assuming that the pitch P=0.01 mm and regarding the vertical and horizontal directions, the Nyquist frequency vn is vn=1/(2×2P)=25. On the other hand, the response characteristic of the image pickup element 100 on R, G and B is as shown in FIG. 14. In this illustration, the horizontal axis represents spatial frequency (number/mm) while the vertical axis denotes response, and the rise of the response on the high-frequency side exceeding the Nyquist frequency signifies the "turning noise".

For eliminating such a problem, there is a need to prevent a high-frequency component of an object from reaching an image pickup element at the level of optical images. For suppressing the occurrence of the "turning noise", an optical low-pass filter LPF made from a quartz is interposed between the image pickup optical system 24 and the image pickup element 100 and the characteristic of the optical low-pass filter LPF is set so that the MTF (Modulation Transfer Function) of the image-formation lens approaches zero at the Nyquist frequency vn. This substantially achieves that purpose.

Meanwhile, in the case of the optical low-pass filter LFP utilizing the double-refraction characteristic of the quartz, the MTF does not always reach zero at the Nyquist frequency vn, and there is a probability of taking in an undesirable high-frequency component at the focus detection. However, since the sampling of the R and G images is in a state shifted by half of the pitch and there is a half pitch shifting system for the G image as with the relationship between the R and B images, if the focus detection outputs are obtained from the R and B systems and the two G systems to be averaged, then it is possible to provide a sufficient focus detection accuracy.

In addition, in the in-focus state, since a phase error is equally superimposed on a pair of signals, a focus detection error develops even if the aforesaid phenomenon occurs. This means that, even if the average cannot be calculated because of only one focus detection output, it is possible to secure the final in-focus state.

Furthermore, according to the optical low-pass filter characteristic, one light beam incident on the optical low-pass filter LPF forming a parallel flat plate is divided into two light beams which in turn, are emitted as a parallel light beam. When the incident light and the emergent light are in parallel with each other, although the projection of each light-receiving section to the exit pupil of the image pickup optical system 24 through the microlens creates a blurred image corresponding to approximately 2P, this does not practically produce a problem.

Incidentally, although an optical low-pass filter of the type of one light beam incident thereon being emitted in a state diffused has been known, in the case of this type, the incident light and the emergent light are not in parallel relation to each other. Accordingly, the projection of each light-receiving section to the exit pupil of the image pickup optical system 24 through the microlens goes out of order, which ruins the function of the focus detection system.

Figure 15:
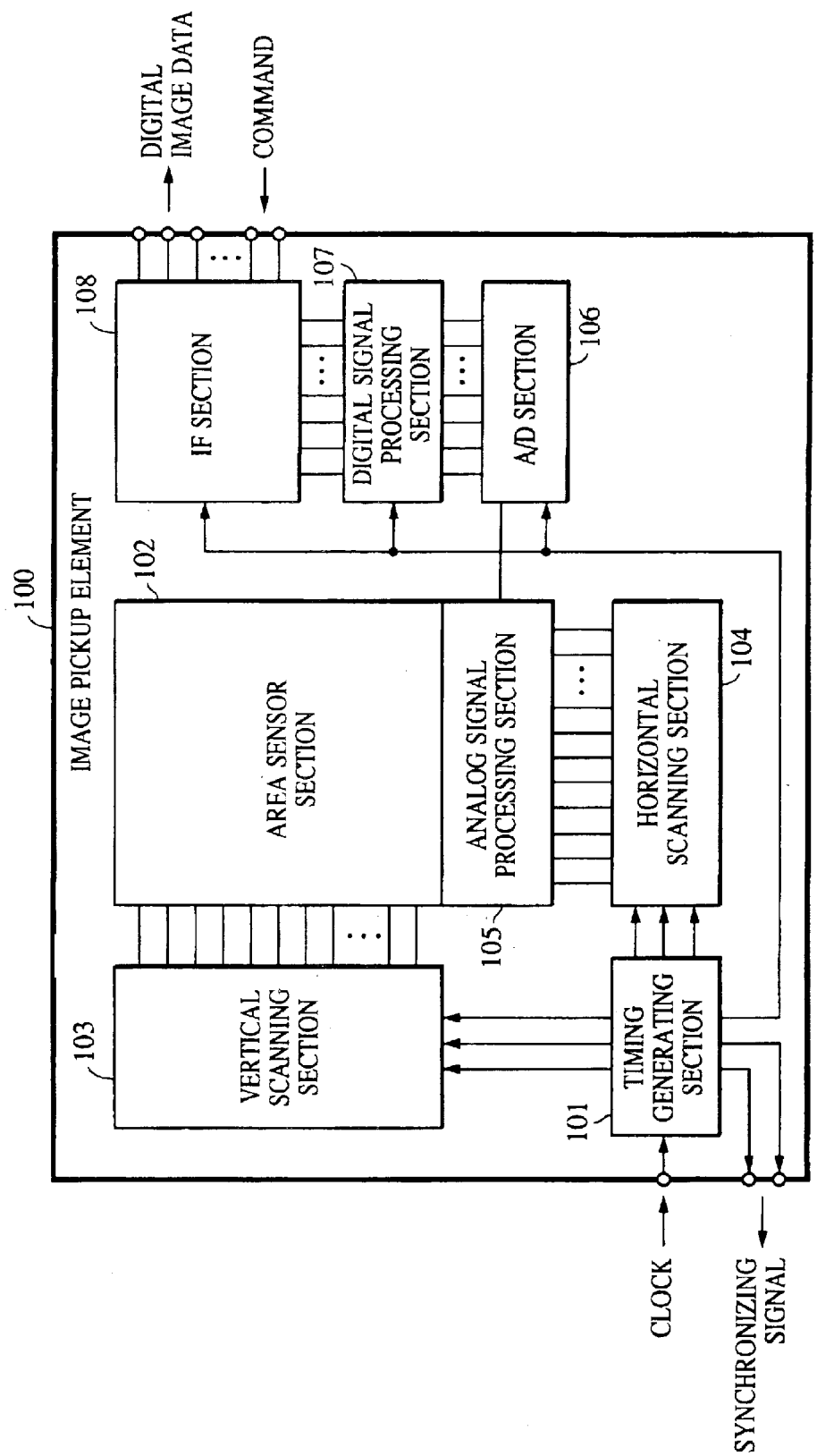
FIG. 15 is a block diagram showing an internal arrangement of an image pickup element, including peripheral circuits, according to the invention.

FIG. 15 is a block diagram showing an internal arrangement of the image pickup element 100 and peripheral circuits. In the image pickup element 100, there are provided a timing generating section 101, an area sensor section 102, a vertical scanning section 103 and horizontal scanning section 104 for selecting the outputs of the pixels, an analog signal processing section 105, an A/D conversion section 106 for conducting analog/digital conversion, a digital signal processing section 107 for converting the digitized signal into an output signal, and an interface (IF) section 108 for outputting a digital image signal to the external and for receiving command data from the external.

In FIG. 15, the area sensor section 102 is the above-mentioned CMOS sensor, and has one source follower type source follower amplifier MOS transistor 5 including the first and second photoelectric conversion sections shown in FIG. 3.

The timing generating section 101 generates a timing signal for reading out an image signal, photoelectric-converted in each pixel, on the basis of a master clock with a reference frequency from the external, with the vertical and horizontal scanning sections 103 and 104 performing needed scanning control in accordance with this timing signal to read out the electric charge photoelectric-converted in each pixel. A vertical synchronizing signal and a horizontal synchronizing signal are outputted from the timing generating section 101 to the external so that synchronizing signals are supplied to systems, other than the image pickup element, which require timing signals.

The analog signal processing section 105 is for conducting the noise reduction processing, the amplification processing, the gamma processing and the clamp processing with respect to the image signal read out from the area sensor section 102 to output the image signal after the processing to the A/D conversion section 106. The A/D conversion section 106 converts this image signal into a digital signal and outputs it, while the digital signal processing section 107 processes the image signal, undergoing the digital conversion in the A/D conversion section 106, with a displayable image signal through the use of an image RAM memory or the like and outputs the processed image signal to the interface section 108.

The interface section 108 outputs the digital image signal, outputted from the digital signal processing section 107, to the exterior of the image pickup element 100.

The image pickup element 100 is controllable in mode, output signal form, signal output timing and others according to a command from the external, and when a predetermined command is given from the external to the interface section 108, according to the command the interface section 108 receives, each of the components is controlled; for example, the vertical and horizontal scanning sections 103 and 104 are controlled for the control of the readout timing to the area sensor section for the focus detection.

The image pickup element 100 is designed to be switched between a first output mode for making a photoelectric conversion output by a light beam from the entire exit pupil of the image pickup lens and a second output mode for making a photoelectric conversion output by a light beam from a portion of the exit pupil of the image pickup lens.

Furthermore, a description will be given hereinbelow of an image output for the focus detection.

As described above with reference to FIGS. 9, 10 and 11, the focus detection image is produced in a manner that the photoelectric conversion of a pair of object images, formed in the second output mode, are performed at substantially the same timing, and an image signal from the first photoelectric conversion section and an image signal from the second photoelectric conversion section are outputted separately and independently.

If an object image projected to a focus detection area is in a defocus condition, the phases of the image signals are shifted in the pupil division direction. Therefore, if the focus detection area is formed into a rectangular configuration whose longitudinal direction coincides with the division direction of the pupil of the image pickup optical system, the phase shift quantity is detected using a long continuous image signal, which increase the precision of the shift quantity detection.

Figure 16:
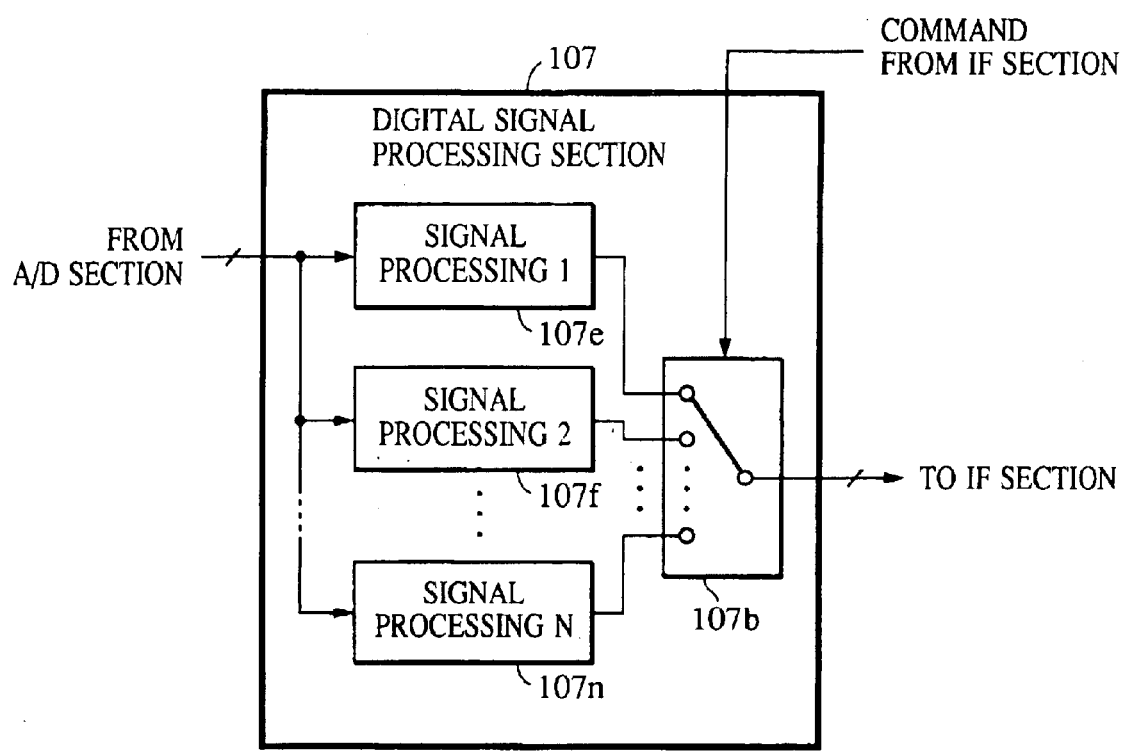
FIG. 16 is an illustration useful for explaining an output position designating command according to the invention.

For easily obtaining the focus detection image, an output position designation command is prepared as one of the commands of the digital signal processing section 107 described above. The output position designation commands are indicated as signal processing 107e, . . . , in FIG. 16 and designate any one of the vertically elongated rectangular focus detection areas 61 to 67 shown in FIG. 4 or a combination thereof. Additionally, it is also appropriate that the selection of a predetermined focus detection area(s) is not made but a pointing device such as a track ball is prepared to output a designation to a CPU included in an operation control section so that the CPU control function arbitrarily designates some of focus detection areas which are approximately several hundreds in number.

The line including the designated specific area is designed to output a focus detection image in a state where the electric charge storage level is optimized. For obtaining an appropriate signal level in the focus detection area, the diaphragm closing shown in FIG. 2 and the electronic shutter setting are formed according to focus detection area. In the CCD type image pickup element, the electric charge accumulating times of all the pixels are the same, whereas, by making use of the feature of the CMOS sensor, the image pickup element 100 can easily employ a structure to perform the readout in units of pixels, lines or blocks, and allows the start and end of the accumulating (storage) time to be different according to unit. In this case, the electric storage time is changed in units of vertical lines so that the image in the focus detection area can effectively use the A/D conversion range.

Figure 17A:
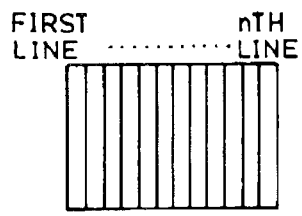
FIGS. 17A to 17D are illustrations for describing an electronic shutter function; of these illustrations.
Figure 17B:
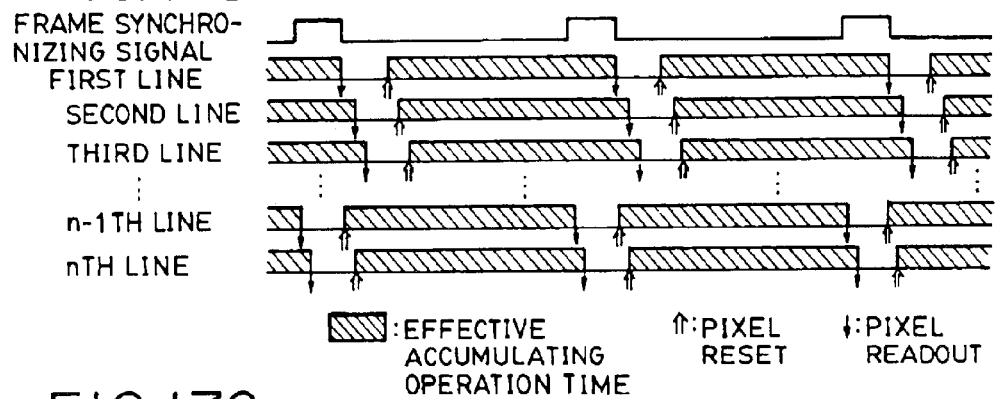

Referring to FIGS. 17A to 17D, a description will be given hereinbelow of an electronic shutter function. In a case in which the pixels are read out in vertical line sequence as shown in FIG. 17A, as FIG. 17B shows, the invalid electric charge stored in the pixels in the first line is reset at the pixel reset indicated by an upward arrow, before the effective accumulating operation starts. The pixel is read at the pixel readout indicated by a downward arrow after the elapse of a predetermined period of time indicated by oblique lines, and the image signal is given to the next-stage signal processing section. Furthermore, the second, third, . . . , lines are scanned likewise. In the effective accumulating operation, different timings are used according to vertical line, but the accumulating times are substantially equal to each other.

Figure 17C:
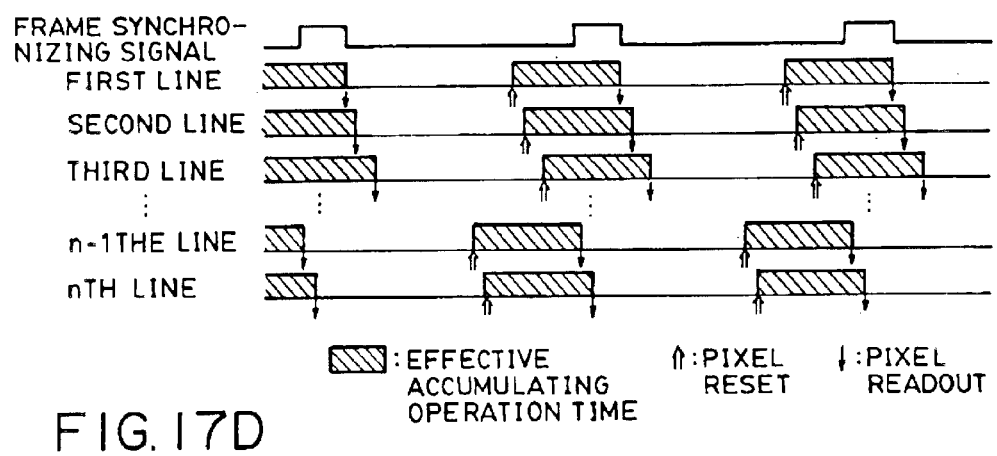

With respect to the entire image plane, in the case of shortening the electric charge accumulating time, as shown in FIG. 17C, the pixel reset timing for resetting the invalid electric charge is shifted backwardly in time, thereby shortening the effective accumulating operation time, and conducting the electronic shutter operation. This operation switches the mode of the timing generating section 101 according to an electronic shutter command received by the interface section 108.

Figure 17D:
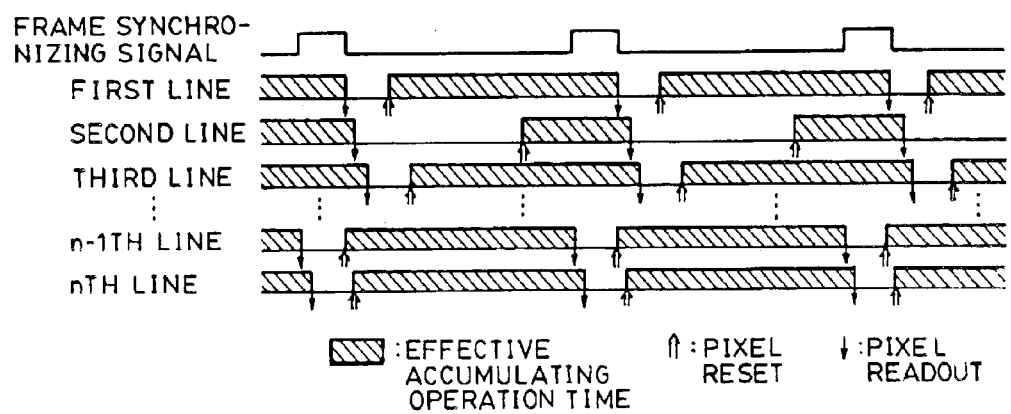

In addition, the setting of the effective accumulating operation time in units of vertical lines is conducted as shown in FIG. 17D. FIG. 17D shows an example in which, assuming that the focus detection area exists on the second line, the effective accumulating time is set to be different from those of the other lines for appropriately setting the signal level in the second line.

The focus detection images thus obtained are a pair of images formed by the halves of a light beam in the second output mode as mentioned above, and although the accumulating time differs from those of the other lines, these are added on the signal processing and multiplied by a gain which eliminates the difference between the accumulating times, thus easily producing information identical in condition to those of the other lines. Accordingly, in a case in which an image picked up is displayed on a monitor, such processing is conducted for obtaining information on the entire image plane while performing the focus detection.

Returning to FIGS. 5 and 3, a detailed description will be given hereinbelow of the electric charge accumulating operation.

First, a positive voltage is applied to control pulses φPGoo (odd lines) and φPGeo (even lines) for enlarging the depletion layers under the photogates 2 and 52. During the accumulation, the FD section 21 sets the control pulse φRo at a high state to fix it to a voltage $V_{DD}$ for preventing the blooming. When carriers occur under the photogates 2 and 52 due to the irradiation of photon hv, an electron is accumulated in the depletion layers under the photogates 2 and 52, and the positive hole is discharged through a P-type well 17.

An energy barrier owing to the transfer MOS transistor 3 is formed between the photoelectric conversion section 1 and the FD section 21, while an energy barrier due to the transfer MOS transistor 53 is formed between the photoelectric conversion section 51 and FD section 21. Thus, during the photoelectric charge accumulation, the electron exists under the photogates 2 and 52. Thereafter, through the scanning of the horizontal scanning section 16, the electric charge accumulating operation is similarly conducted with respect to the photoelectric conversion section 1 and the photoelectric conversion section 51 on the other lines, thus accomplishing the accumulation of the electric charge in all the photoelectric conversion sections.

In a readout condition, the control pulses φPGoo and φPGeo and control pulses φTXoo and φTXeo are set so that the barrier created by the transfer MOS transistor 3 or 53 is removed and the electron under the photogate 2 or 52 is completely transferred to the FD section 21.

(Second Output Mode Operation)

Referring to the timing chart of FIG. 18, a description will be given hereinbelow of an image pickup element readout operation. This timing chart shows the case of the second output mode for performing two photoelectric conversion section outputs independently, and is for reading out the focus detection image.

First, the control pulse φL is set to a high state by the timing output from the horizontal scanning section 16 to lower the horizontal output line to a reference electric potential point Vss for resetting it. Additionally, the control pulses φRo, φPGoo and φPGoo are set to a high state to turn on the reset MOS transistor 4, and the first layer poly-Si 19 of the photogate 2 is set to a high state.

At the time $T_0$, a control pulse φSo is set to a high state to turn on the selection switch MOS transistor 6 for selecting the light-receiving section 30-11. Following this, the control pulse φRo is set to a low state to stop the reset of the FD area 21, and the FD area 21 is set into a floating condition and the through-condition is made between the gate and source of the source follower amplifier MOS transistor 5, and thereafter, at the time $T_1$, a control pulse φ$T_N$, is set to a high level so that the dark voltage of the FD area 21 is outputted to the accumulation capacitor $C_{TN}$ 10 through a source follower operation.

Subsequently, for making the photoelectric conversion output of the first photoelectric conversion section, the control pulse φTXoo is set to a high level to establish a conducting condition of the transfer switch MOS transistor 3, and at the time $T_2$, the control pulse φPGoo is set to a low level. At this time, it is preferable to establish a voltage relationship in which the potential well enlarging under the photogate 2 rises to completely transfer the optical generation carrier to the FD area 21.

When the electric charge from the photoelectric conversion section 1 of the photodiode is transferred to the FD area 21 at the time $T_2$, the electric potential of the FD area 21 varies according to light. At this time, since the source follower amplifier MOS transistor 5 is in the floating condition, at the time $T_3$, the electric potential of the FD area 21 is outputted to the accumulation capacitor $C_{TS}$ 11 with the control pulse φTs being set to a high level. At this point of time, the light output and dark output of the first photoelectric conversion section are stored in the accumulation capacitors $C_{Tn}$ 10 and $C_{TS}$ 11, and a control pulse φHc at the time $T_4$ is temporarily set to a high state to establish the conduction states of the vertical output line reset MOS transistors 13 and 55 for resetting the vertical output line, and in the vertical transfer period, according to a scanning timing signal of the vertical scanning section 15, the MOS switches 12 and 54 are turned on to supply the pixel dark output and the optical light output to the vertical signal line. When the outputs of the accumulation capacitors $C_{TN}$ 10 and $C_{TS}$ 11 are fed to the differential amplifier 14 to obtain a differential output $V_{OUT}$, the pixel random noise and the fixed pattern noise are removed, thus providing an image signal with a high S/N ratio.

The photoelectric charge of the light-receiving section 30-12 is stored in the accumulation capacitors $C_{TN}$ 10 and $C_{TS}$ 11 concurrently with those of the light-receiving section 30-11, and the read out thereof is made in a state where the timing pulse from the vertical scanning section 15 is delayed a quantity corresponding to one light-receiving section. They are read out to the vertical output line and are outputted from the differential amplifier 14. When this scanning is repeated, it is possible to obtain image signals according to the corresponding photoelectric conversion sections at different times in the time series. Because of the timing pulse difference corresponding to one light-receiving section, it can be considered that both the accumulation times are the same.

Furthermore, after the light output is sent to the accumulation capacitor $C_{TS}$ 11, the control pulse φRo is set to a high state to establish the conducting condition of the reset MOS transistor 4 for resetting the FD area 21 to the power supply $V_{DD}$.

After the vertical transfer of the first photoelectric conversion comes to an end, the readout of the second photoelectric conversion section is conducted. For the readout of the second photoelectric conversion section, the control pulse φRo is set to a low state to stop the reset of the FD area 21 and the FD area 21 is set into the floating condition and the through-condition is set up between the gate and source of the source follower amplifier MOS transistor 5, and at the time $T_5$, the control pulse φ$T_N$ is set to a high state and the dark voltage of the FD area 21 is outputted to the accumulation capacitor $C_{TN}$ 10 in the source follower operation.

For the photoelectric conversion output of the second photoelectric conversion section, the control pulse φTXeo is set to a high state to establish the conducting condition of the transfer switch MOS transistor 53, and at the time $T_6$, the control pulse φPGeo is set to a low state.

At the time $T_6$, the electric charge from the photoelectric conversion section 2 of the photodiode is transferred to the FD area 21 so that the electric charge in the FD area 21 varies according to light. At this time, since the source follower amplifier MOS transistor 5 is in the floating condition, at the time $T_7$, the electric charge of the FD area 21 is outputted to the accumulation capacitor $C_{TS}$ 11 with the control pulse φTs being set to a high state. At this point of time, the light output and dark output of the second photoelectric conversion section are stored in the accumulation capacitors $C_{TN}$ 10 and $C_{TS}$ 11, respectively, and at the time $T_8$, the control pulse φHc is temporarily set to a high state to set up the conducting conditions of the vertical output line reset MOS transistors 13 and 55 for resetting the vertical output lines, and in the vertical transfer period, the pixel dark output and light output are fed to the vertical output line according to the scanning timing signal of the vertical scanning section 15. At this time, a differential output $V_{OUT}$ is obtained from the accumulation capacitors $C_{TN}$ 10 and $C_{TS}$ 11 by means of the differential amplifier 14.

With the above-mentioned operations, the readout of the first and second photoelectric conversion sections can be made independently of each other.

Thereafter, the scanning of the horizontal scanning section 16 is conducted to perform the readout operation similarly, thus providing an independent output of the entire photoelectric conversion section corresponding to one frame. That is, the control pulse φ$S_1$ is first set to a high state and then the control pulse φ$R_1$ is set to a low state, and further the control pulses φ$T_N$ and φ$TX_{01}$ are set to a high state, the control pulse φ$PG_{01}$ is set to a low state, the control pulse φTs is set to a high state, and the control pulse φHc is temporarily set to a high state, thereby reading out the signals of the first photoelectric conversion sections of the light-receiving sections 30-21 and 30-22. Subsequently, the control pulses φ$TXe_1$ and φ$PGe_1$ are applied and the other control pulses are applied as mentioned above, thereby reading out the signals of the second photoelectric conversion sections of the light-receiving sections 30-21 and 30-22.

Because one source follower is not provided in each of the two photoelectric conversion sections in one pixel but is provided for two photoelectric conversion sections, it is possible to halve the source follower amplifier MOS transistors 5, the selection switch MOS transistors 6 and the reset MOS transistors 4 as compared with the conventional art. Accordingly, the open area ratio of the photoelectric conversion section in the pixel is improvable and the fining is realizable by the integration of the pixels, which extremely facilitates the use for the focus detection. Additionally, since the FD area 21 is used in common for two photoelectric conversion sections, there is no need to increase the capacity of the gate section of the source follower amplifier MOS transistor 5, thereby preventing a drop of the sensitivity.

(First Output Mode Operation)

Secondly, a description will be given hereinbelow of a first output mode in which the signals of the first and second photoelectric conversion sections are added in the FD area 21 to output a signal based on a light beam from the entire pupil of an objective lens. This operating mode is equivalent to an image output in a common image pickup element.

FIG. 17 is a timing chart in a case of adding the signals of the first and second photoelectric conversion sections. Although, in the non-adding mode shown in FIG. 18, the timings of the control pulse φTXoo, the control pulse φTXeo, the control pulse φPGoo and the control pulse φPGeo are in shifted conditions, the same timing is taken in the case of the addition in this first output mode. That is, for simultaneously performing the readout from the first photoelectric conversion section and the second photoelectric conversion section of the light-receiving section 30-11, the control pulse φT$_N$, is set to a high state to read out a noise component from the horizontal output line, and then the control pulses φTXoo and φTXeo and the control pulses φPGoo and φPGeo are simultaneously set to the high and low states in transferring to the FD area 21. This enables the signals of the two upper and lower photoelectric conversion sections to be added in the FD area 21. Because of the signal addition at the pixel level, an image with a high S/N ratio, which is not obtainable by the addition after the signal readout, is attainable without receiving the influence of the amplifier noise.

Figure 18:
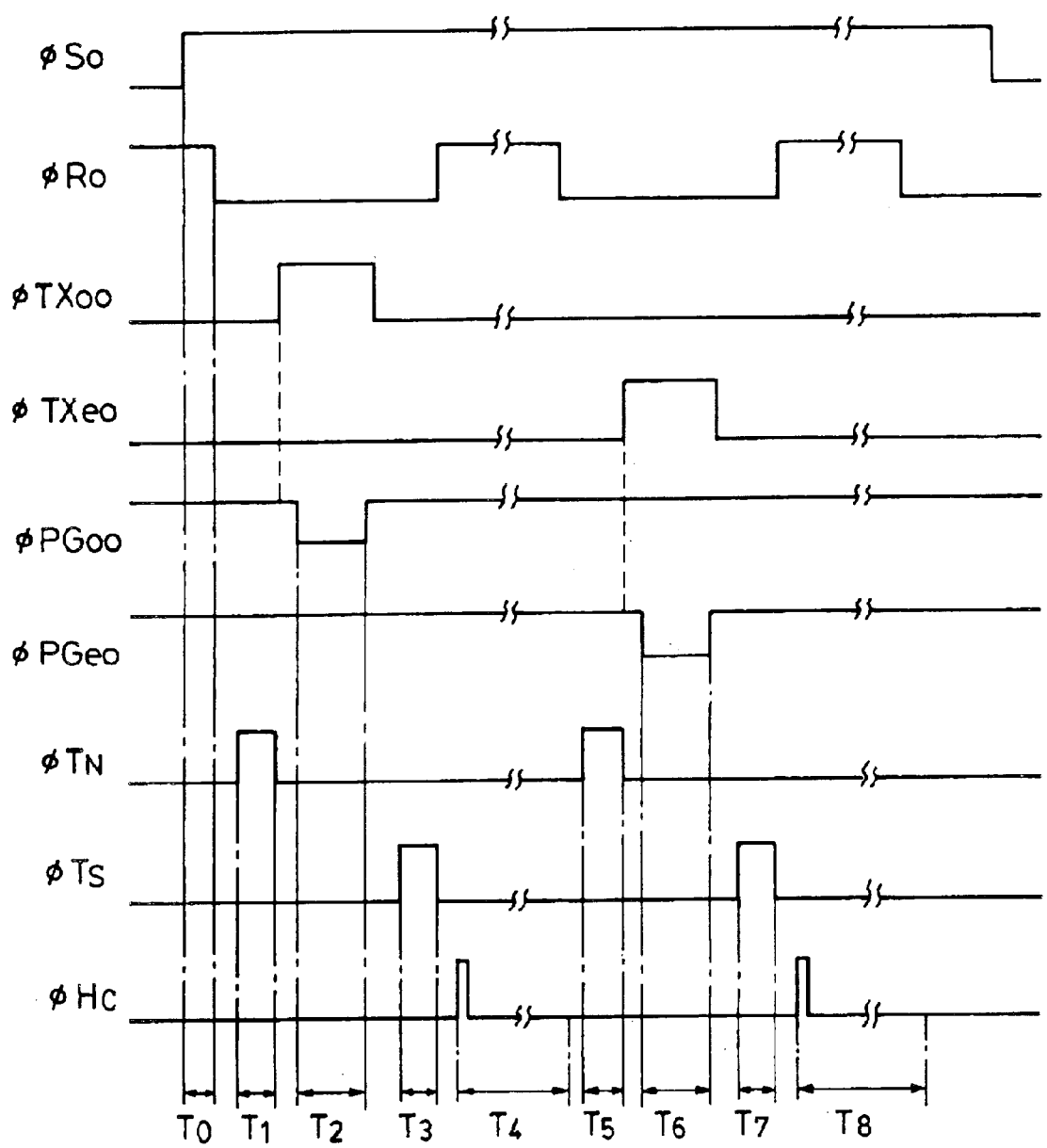
FIG. 18 is a timing chart in a case of independently reading out signals of first and second photoelectric conversion sections according to the invention.
Figure 19:
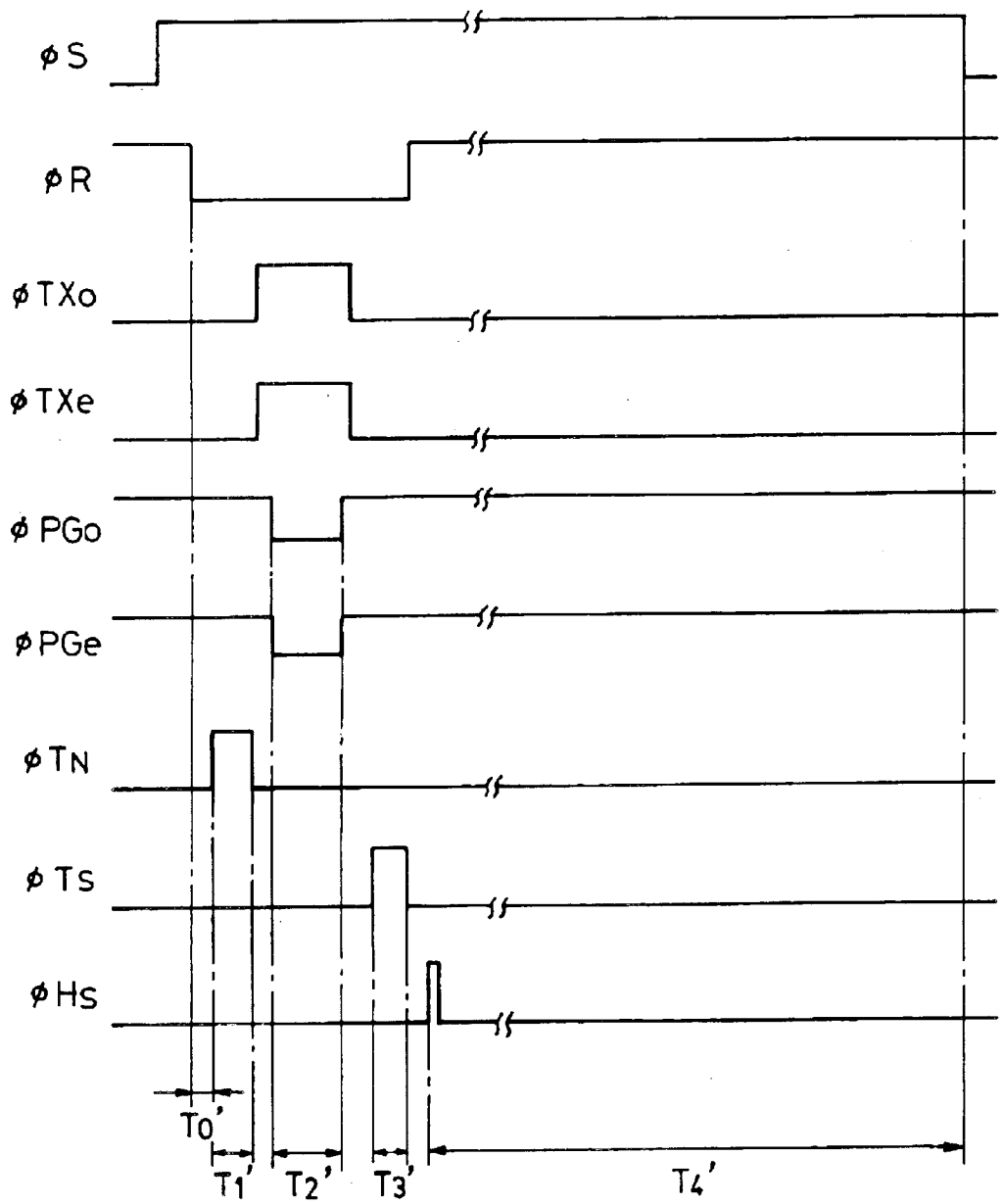
FIG. 19 is a timing chart in a case of adding the signals of the first and second photoelectric conversion sections according to the invention.

As described above, with regard to the readout according to the timings shown in FIG. 18, the focus detection image for focus detection on the image pickup lens can be outputted, while according to the timings shown in FIG. 19, the common image based on the entire light beam can be outputted. That is, it is possible to accomplish the switching between the first output mode in which the photoelectric conversion output is made by a light beam from the entire exit pupil of the image pickup lens and the second output mode in which the photoelectric conversion output is made by a light beam from a portion of the exit pupil of the image pickup lens.

According to the first output mode, because the image is not blurred unnaturally, it is possible to produce a high-quantity image excellent in S/N ratio at the same level as that of an image to be originally produced by an image pickup element which is designed to offer an image based on the entire light beam passing through the pupil of an image pickup optical system.

(Focus Detection Signal Processing)

Figure 20:
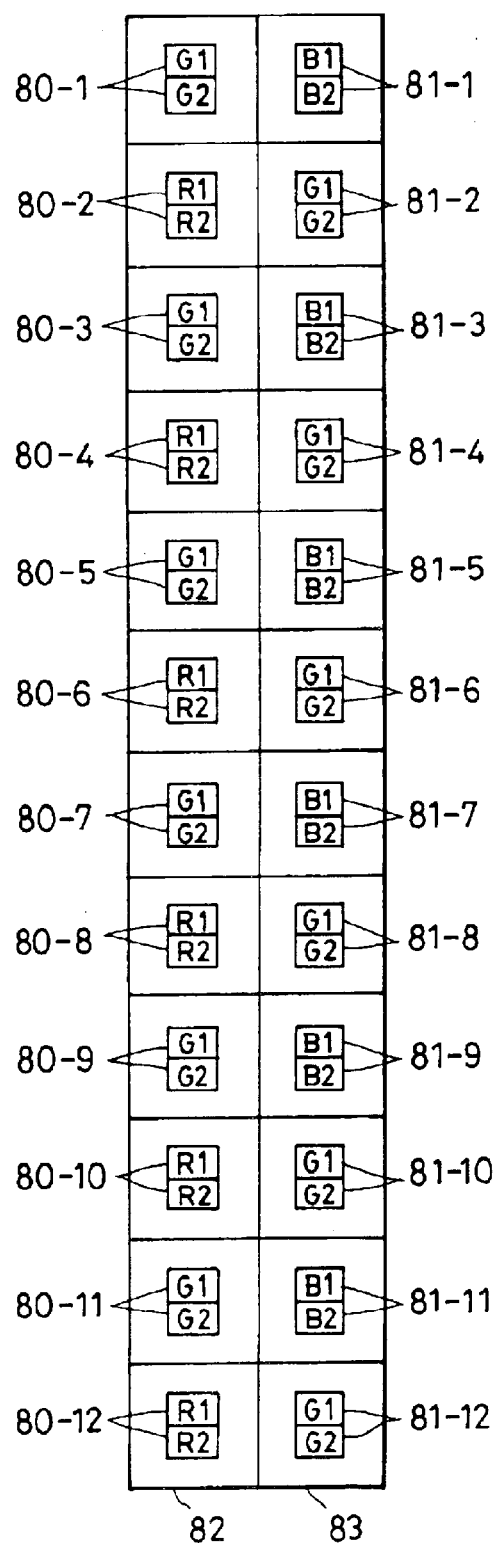
FIG. 20 is an enlarged view showing a focus detecting area according to the invention.

A description will be given hereinbelow of signal processing for the focus detection. FIG. 20 is an enlarged view showing the focus detection area 61 shown in FIG. 4. The other focus detection areas 62, 63, 64, 65, 66 and 67 also have the same structure. FIGS. 21 to 28 are graphic illustrations of detection characteristics, and show digital image signals outputted from the interface section 108 mentioned above with reference to FIG. 15.

As FIG. 20 shows, the focus detection area 61 has two sets of pixel columns each comprising twelve light-receiving sections. The pixel column 82 is composed of the light-receiving sections 80-1, 80-2, . . . , 80-12, while the pixel column 83 is composed of the light-receiving sections 81-1, 81-2, . . . , 81-12. Since the color filters of the area sensor section 102 are arranged to form a Bayer pattern, two kinds of color filters are alternately arranged in each of the pixel columns 82 and 83. Thus, for the focus detection, the pixel columns 82 and 83 are classified according to the kind of the color filter, and a pair of image signals, being the signal from the first photoelectric conversion section and the signal from the second photoelectric conversion section, are produced therefrom. Accordingly, the image signals G1, G2, R1 and R2 due to the pixel column 82 and the image signals G1, G2, B1 and B2 due to the pixels column 83, i.e., four pairs of image signals in total, are obtainable from the focus detection area 61. Incidentally, as mentioned above, the accumulating time is substantially taken evenly in one focus detection area.

FIGS. 21 to 24 illustrate these four pairs of image signals.

Figure 21:
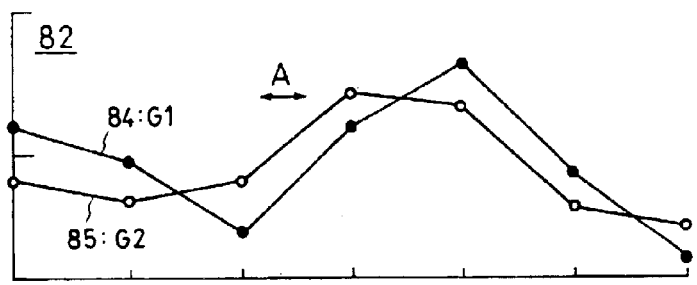
FIG. 21 is an illustration of image signals from light-receiving sections equipped with green color filters in a pixel line according to the invention.

FIG. 21 shows image signals from the light-receiving sections 80-1, 80-3, . . . , 80-11 equipped with a green color filter in the pixel column 82, where numeral 84 denotes a signal of the first photoelectric conversion section indicated by G1, while numeral 85 depicts a signal of the second photoelectric conversion section indicated by G2.

Figure 22:
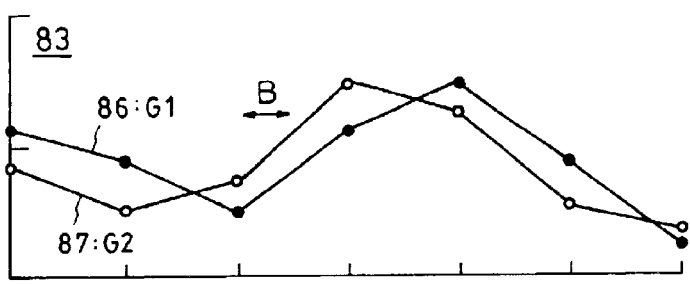
FIG. 22 is an illustration of image signals from light-receiving sections equipped with green color filters in a pixel line according to the invention.

FIG. 22 shows image signals from the light-receiving sections 81-2, 81-4, . . . , 81-12 equipped with a green color filter in the pixel column 83, where numeral 86 denotes a signal of the first photoelectric conversion section indicated by G1, while numeral 87 depicts a signal of the second photoelectric conversion section indicated by G2.

Figure 23:
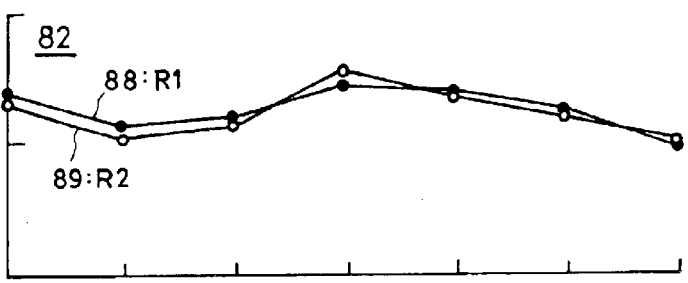
FIG. 23 is an illustration of image signals from light-receiving sections equipped with red color filters in a pixel line according to the invention.

FIG. 23 shows image signals from the light-receiving sections 80-2, 80-4, . . . , 80-12 equipped with a red color filter in the pixel column 82, where numeral 88 denotes a signal of the first photoelectric conversion section indicated by R1, while numeral 89 depicts a signal of the second photoelectric conversion section indicated by R2.

Figure 24:
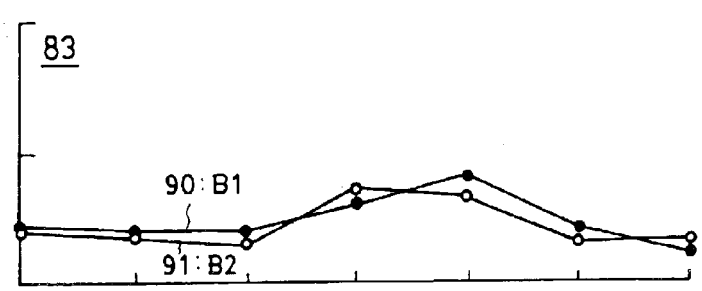
FIG. 24 is an illustration of image signals from light-receiving sections equipped with blue color filters in a pixel line according to the invention.

FIG. 24 shows image signals from the light-receiving sections 81-1, 81-3, . . . , 81-11 equipped with a blue color filter in the pixel column 83, where numeral 90 denotes a signal of the first photoelectric conversion section indicated by B1 while numeral 91 depicts a signal of the second photoelectric conversion section indicated by B2.

These are examples in which an object image formed on the focus detection area 61 by the image pickup optical system 24 has a density-varying image of an orange color and a yellow color. In FIGS. 21 and 22, the contrast of green is high, and in FIG. 23, the contrast of red is low and the intensity thereof is high. Furthermore, in FIG. 24, both the contrast and intensity of blue are low. The illustrations show a defocus state of an object image, and as indicated by arrows A and B, it is seen that the signal of the first photoelectric conversion section and the signal of the second photoelectric conversion section are shifted in phase from each other.

Furthermore, FIGS. 25 to 28 show signals in a state where the focus is placed on an object image, each of which varies with the movement of the second group grp2 of the image pickup optical system 24.

Figure 25:
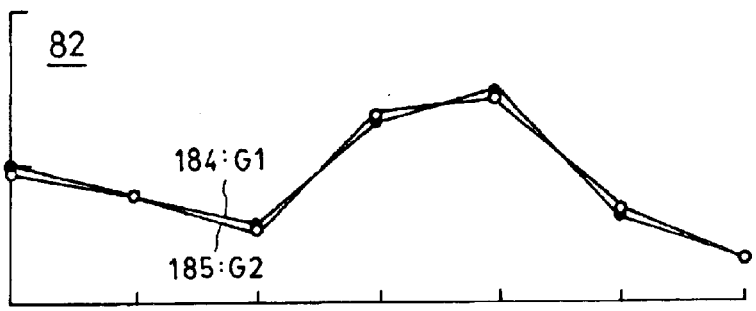
FIG. 25 is an illustration of image signals from light-receiving sections equipped with green color filters in a pixel line according to the invention.

FIG. 25 shows image signals from the light-receiving sections 80-1, 80-3, . . . , 80-11 equipped with a green filter in the pixel column 82, where numeral 184 denotes a signal of the first photoelectric conversion section indicated by G1 while numeral 185 depicts a signal of the second photoelectric conversion signal indicated by G2.

Figure 26:
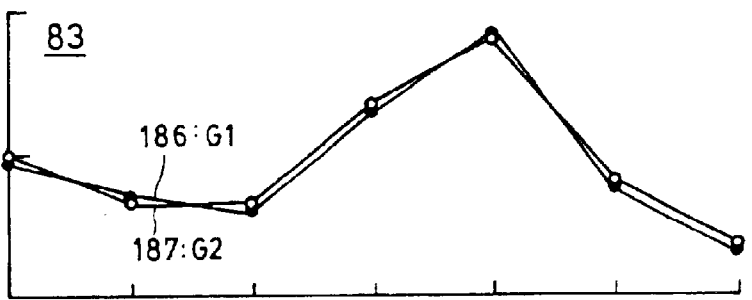
FIG. 26 is an illustration of image signals from light-receiving sections equipped with green color filters in a pixel line according to the invention.

FIG. 26 shows image signals from the light-receiving sections 81-2, 81-4, . . . , 81-12 equipped with a green filter in the pixel column 83, where numeral 186 denotes a signal of the first photoelectric conversion section indicated by G1 while numeral 187 depicts a signal of the second photoelectric conversion signal indicated by G2.

Figure 27:
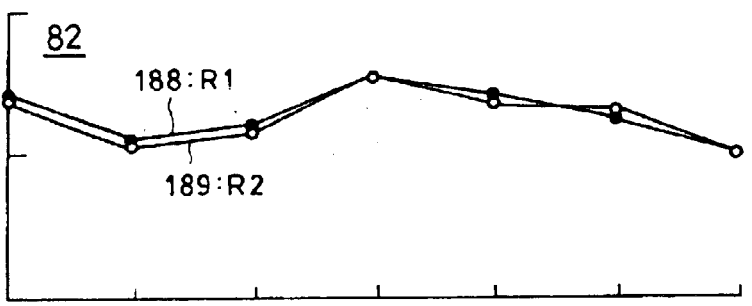
FIG. 27 is an illustration of image signals from light-receiving sections equipped with red color filters in a pixel line according to the invention.

FIG. 27 shows image signals from the light-receiving sections 80-2, 80-4, . . . , 80-12 equipped with a red filter in the pixel column 82, where numeral 188 denotes a signal of the first photoelectric conversion section indicated by R1 while numeral 189 depicts a signal of the second photoelectric conversion signal indicated by R2.

Figure 28:
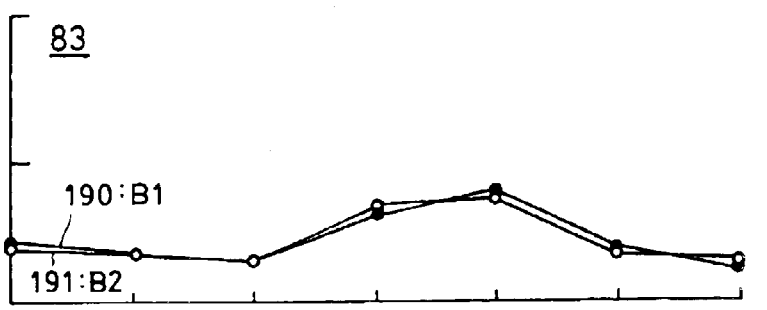
FIG. 28 is an illustration of image signals from light-receiving sections equipped with blue color filters in a pixel line according to the invention.

FIG. 28 shows image signals from the light-receiving sections 81-1, 81-3, . . . , 81-11 equipped with a blue filter in the pixel column 83, where numeral 190 denotes a signal of the first photoelectric conversion section indicated by B1 while numeral 191 depicts a signal of the second photoelectric conversion signal indicated by B2.

In a state where the focus is placed on an object, the signals of the first and second photoelectric conversion sections agree in phase with each other. Accordingly, the in-focus detection is feasible by a decision on the identity of a pair of signals. Additionally, by detecting the phase shift quantity according to a well-known method (for example, Japanese Patent Publication No. 5-88445) using the correlation operation, it is possible to obtain the defocus quantity.

A description will be given hereinbelow of a signal processing method for two images undergoing a photoelectric conversion. In the foregoing correlation operation, for example, when each of the numbers of photoelectric conversion elements of the first and second photoelectric conversion sections is taken to be N and the outputs of the photoelectric conversion elements are respectively taken as $a(i)$ and $b(i)$ ($i=1$ to $N$), the cross correlation $V(m)$ is given as follows.

$$V(m)=\Sigma(|a(i)-b(i+1-m)|-|a(i+1)-b(i-m)|) \quad (1)$$

When the shifting quantity between the two images is small, that is, when they coincide with each other, the correlation $V(m)$ assumes a minimum value.

Furthermore, it is also appropriate to obtain the correlation $V(m)$ in accordance with the following equation.

$$V(m)=\Sigma(|a(i)-b(i+1-m)|^P-|a(i+1)-b(i-m)|^P) \quad (2)$$

where P represents a constant being a positive number.

In addition, when min(x, y) or max(x, y) are taken as a small one or large one of two real numbers x and y, the correlation $V(m)$ can also be calculated according to the following equations.

$$V(m)=\Sigma[\min\{(a(i), b(i+1-m)\}-\min\{a(i+1), b(i-m)\}] \quad (3)$$

$$V(m)=\Sigma[\max\{(a(i), b(i+1-m)\}-\max\{a(i+1), b(i-m)\}] \quad (4)$$

Through the use of these calculations, it is possible to detect the phase shifting quantity and to detect the image-formation state of the image-formation lens.

Subsequently, the defocus quantity is obtained and the obtained defocus quantity is converted into a quantity by which the second group grp2 of the image-formation optical system 24 is to be driven, thereby conducting the automatic focusing. Since the driving quantity of the lens can be known in advance, the in-focus position is commonly achievable by almost one-time lens driving so that the focusing is realizable at an extremely high speed.

Furthermore, although the signals color-separated have been used in this case, since the non-color-separation is equivalent to the acquisition of the signal obtained by adding these signals, a low contrast tends to occur; in consequence, the detection-impossible condition easily occurs. On the other hand, if the signals color-separated are put to use, although a high contrast does not always appear in all the R, G and B signals as mentioned above, a high contrast is conversely obtainable in any one of the R, G and B signals and the focus detection becomes almost always possible.

Incidentally, although an object image passing through the optical low-pass filter LPF is incident on the image pickup element 100, because of the characteristics of the optical system, high-frequency components higher than the Nyquist frequency $vn=1/(2\times 2P)$ of the focus detection system are not without being introduced. Accordingly, depending upon the pattern of an object, the phase of the object image does not reflect the phase of a signal and the focus detection result may include somewhat of an error.

In the case of no image phase difference, since an phase error is evenly introduced into a pair of signals, even if this phenomenon occurs, no focus detection error occurs. That is, in the case of the signals shown in FIGS. 25 and 26, an error does not occur at the in-focus decision, but in the case of the signals shown in FIGS. 21 and 22, an error occurs at the defocus quantity detection.

However, this defocus quantity detection error does not create a problem, because, as seen from FIGS. 20 to 22, the signals 86 and 87 are shifted by half of the pitch in sampling position of the object image with respect to the signals 84 and 85 and, if the focus detection result calculated on the basis of the signals 84 and 85 and the focus detection result obtained on the basis of the signals 86 and 87 are averaged to obtain the final focus detection result, the focus detection error is reducible.

Likewise, since the signals 90 and 91 are shifted by half of the pitch in sampling position with respect to the signals 88 and 89, the focus detection error is reducible by averaging the focus detection result calculated on the basis of the signals 88 and 89 and the focus detection result calculated on the basis of the signals 90 and 91 for obtaining the final focus detection result. In this case, the averaging of the focus detection results is made with respect to red and blue, and in consequence, the chromatic aberrations of the image pickup optical system 24 are averaged; therefore, this is preferable.

Furthermore, if only high-reliability focus detection results are selected from the focus detection result calculated from the signals 84 and 85, the focus detection result calculated from the signals 86 and 87, the focus detection result calculated from the signals 88 and 89 and the focus detection result calculated from the signals 90 and 91 and averaged, a higher focus detection accuracy is attainable. For example, in the case of a low-contrast signal shown in FIG. 23 or 24, the focus, detection result calculated therefrom may not be used for the focusing.

(Defocus Handling Processing)

The above description has been given assuming that the signal of the first photoelectric conversion section and the signal of the second photoelectric conversion section have a relationship in which only their phases are shifted from each other. However, this assumption is satisfied in a case in which the defocus quantity is relatively small. Secondly, a description will be given hereinbelow of a way of dealing with large focus situations.

In the image pickup unit shown in FIG. 2, the diaphragm ST has five openings (apertures) 204 to 208. The openings 204, 205 and 206 are for image pickup, while the openings 207 and 208 are for large-defocus detection. At the image pickup, one of the openings 204 to 206 is automatically selected according to the luminance of an object to be imaged. Alternatively, it is also possible that a user arbitrarily selects one of the openings 204 to 206. As the opening is made smaller, that is, if the opening 205 is selected instead of the opening 204 or the opening 206 is selected in place of the opening 205, the in-focus range becomes deeper on the field side and the time of the electric charge accumulation by the electronic shutter is prolonged.

Each of the microlenses placed on the image pickup element projects each of the light-receiving sections of the image pickup element 100 to the exit pupil of the image pickup optical system 24, and for establishing a linear relationship between the light quantity incident on each light-receiving section of the image pickup element 100 and the opening of the diaphragm ST, the power is set so that the projected image of each light-receiving section becomes larger than the exit pupil of the image pickup optical system 24 at the release of the diaphragm ST. That is, when the light-receiving section projected image and the opening are compared with each other on the diaphragm ST, the light-receiving section projected image is larger than the largest opening 204. In this way, the incident light quantity on the image pickup element 100 becomes approximately proportional to the opening area of the diaphragm ST, and knowing the subject luminance and the sensitivity of the image pickup element 100, the diaphragm opening degree and the shutter speed are calculable in the same manner as that for a film camera. That is, the incident light quantity becomes proportional to the diaphragm opening area to satisfy the calculation according to the APEX mode.

As described above with reference to FIG. 12, when the image pickup is made using any one of the openings 204, 205 and 206, the image formed is based on half of a light beam in a state where a circle is divided into two sections. In general, an object image is given by a combination of point images and luminance patterns of the object, and when the defocus quantity of the object image increases, the form of the exit pupil appears on the point images. In consequence, a blurred state appears on the image in the form of the division of a circle into two sections.

When the formation of a pair of focus detection images is made through a pair of exit pupils which overlap by parallel movement, irrespective of the configuration of individual pupils, the signals of the first and second photoelectric conversion sections show a relationship in which only their phases are shifted from each other. However, as FIG. 12 shows, in the case of this image pickup unit, the configurations of the first area 211 and the second area 212 on the exit pupil are in reversed relation to each other, and they do not overlap by the parallel movement. Accordingly, the blurs to be superimposed on the image similarly result in reversed relation to each other; hence, the signals of the first and second photoelectric conversion sections develop a state in which their phases shift from each other while their configurations vary. At a large-defocus condition, the image phase difference detection becomes difficult, thereby creating a large-defocus quantity detection error.

In addition, as another factor to increase the defocus quantity detection error in a large-defocus condition, there is an error stemming from manufacturing of microlenses. As mentioned above, the microlens projects a light-receiving section to the exit pupil of an image pickup optical system. If the projection position varies according to pixel, then the phase shift quantity assumes a different value according to pixel. This effect becomes more serious as the defocus quantity increases. However, the microlens has a very fine structure; therefore, in fact, the difference among the microlenses stemming from the manufacturing may be compromised to some degree.

Figure 29:
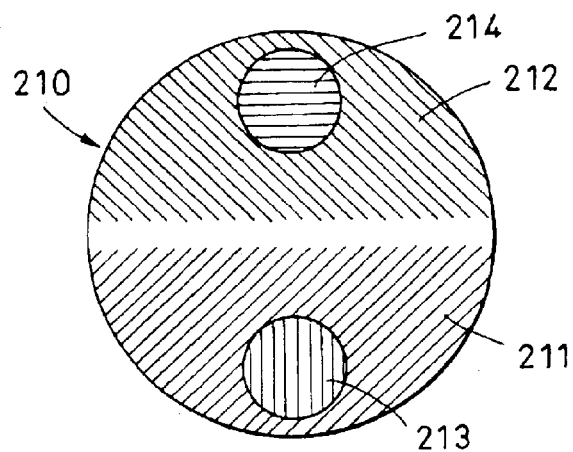
FIG. 29 is an illustration useful for describing a state of division of an exit pupil at detection of a large defocus according to the invention.

Accordingly, for a large focus detection, the large-defocus detection openings 207 and 208 of the diaphragm ST are put to use. In this case, the state of the division of the exit pupil is as shown in FIG. 29. In FIG. 29, numerals 213 and 214 denote virtual images of the diaphragm openings 207 and 208 viewed through the rear lens group 202, and signify a third area and a fourth area formed on the exit pupil by the openings 207 and 208.

The third area 213 is included in the first area 211 and the fourth area 214 is included in the second area 212, and therefore, the openings 207 and 208 determine the configuration of the exit pupil. A light beam passing through the opening 207 is incident on the first photoelectric conversion section while a light beam passing through the opening 208 is incident on the second photoelectric conversion section.

Although the first area 211 and the second area 212 receive the influence of the accuracy of the pupil projection by the microlens, the third area 213 and the fourth area 214 are not affected by the microlens pupil projection accuracy. Accordingly, even if a microlens manufacturing error occurs and even if the positions of the first area 211 and the second area 212 vary according to pixel, the use of the openings 207 and 208 prevents the variation to provide the third area 213 and the fourth area 214 in a fixed condition.

For example, if the configurations of the openings 207 and 208 are made to be an ellipse or a circle, since they are the same configurations which can overlap with each other according to the parallel movement, the signals of the first and second photoelectric conversion sections have a relationship in which only their phases are fully shifted from each other. Additionally, they are not affected by the microlens manufacturing error. Accordingly, even if the defocus is large, it is possible to suppress the defocus quantity detection error to an extremely small value. Furthermore, when the incidence heights of the centers of gravity of the openings 207 and 208 are set at approximately 0.7 times the opening diameter of the diaphragm released, it is possible to precisely detect the defocus quantity to the best resolution in an image pickup optical system having a common spherical aberration characteristic at the aberration level.

Incidentally, when the second group grp2 and fourth group grp4 of the image pickup optical system 24 are moved in the optical axis direction for zooming, although the release F-number varies commonly, since the positional relationship in center of gravity between the openings 207 and 208 with respect to the release opening is maintained at a constant ratio, the incidence heights of the centers of gravity of the openings 207 and 208 preferably become approximately 0.7 times the release opening diameter at all times regardless of the zoom position.

In the first focusing operation in which there is a low possibility of the focus being placed on an object of the subject, the openings 207 and 208 are first used and, even in the case of a large defocus, a monitor display for focusing and object observation is made to deal with this large defocus. In the following focusing operations, further focusing and monitor display may be made through the use of any one of the openings 204, 205 and 206 and the sequence of the image pickup unit may be arranged for the subsequent image pickup.

This image pickup unit does not require a dedicated focus detecting device for detecting a defocus quantity of the image pickup optical system, and hence, there is no need to use a mirror and prism for division of an optical path.

[Second Embodiment]

Figure 30:
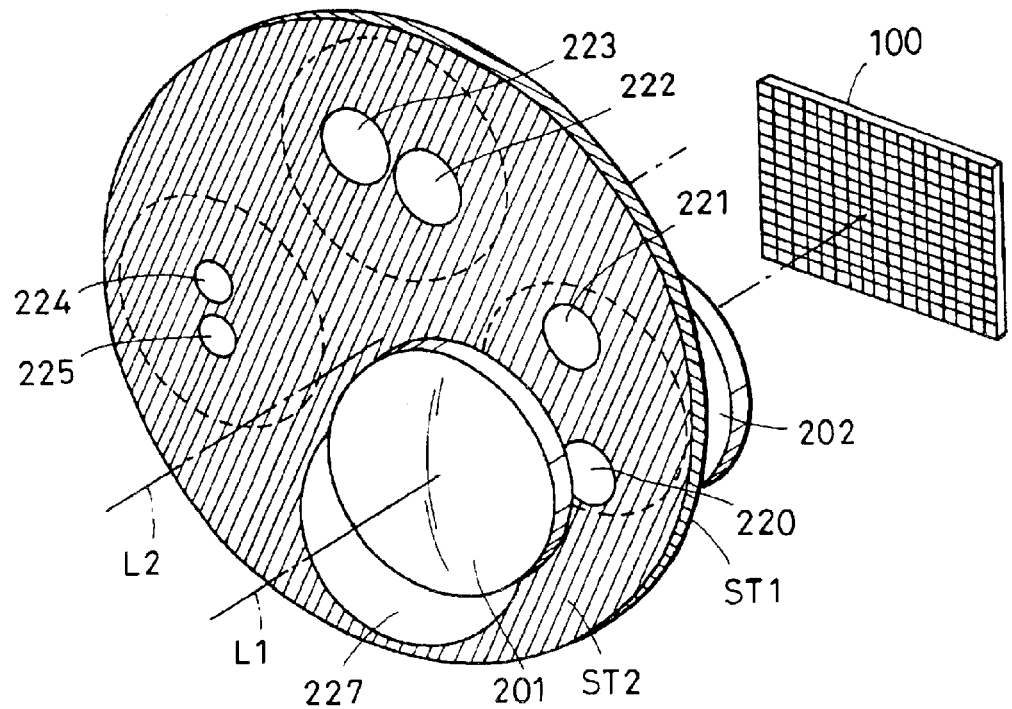
FIG. 30 is a perspective view showing an image pickup unit according to a second embodiment of the invention.

FIG. 30 shows an image pickup unit according to a second embodiment of the present invention. In the illustration, reference mark ST1 represents a first diaphragm and reference mark ST2 designates a second diaphragm rotatable coaxially with the first diaphragm ST1. The first diaphragm ST1 excludes the large-defocus detection openings 207 and 208 from the diaphragm ST according to the first embodiment shown in FIG. 28. The first and second diaphragms ST1 and ST2 are disposed in a state adjacent to each other. The first and second diaphragms ST1 and ST2 are driven by a motor (not shown) to take three or four positions.

In FIG. 30, numeral 201 designates, of an image pickup optical system 24, a front lens group collectively representing a first group (grp1) and a second group (grp2) existing on the object side with respect to the diaphragms ST1 and ST2, numeral 202 represents, of the image pickup optical system 24, a rear lens group collectively representing a third group (grp3), a fourth group (grp4) and an optical low-pass filter LPF existing on the image plane side with respect to the diaphragms ST1 and ST2, with light beams passing through the openings of the diaphragms ST1 and ST2 forming an object image on an image pickup element 100. The diaphragms ST1 and ST2 are individually rotatable around the axis L2, and selectively take three or four positions existing at an interval of a predetermined angle by means of a driving force of the motor (not shown).

The second diaphragm ST2 has seven openings designated at reference numerals 220 to 227, with the opening 227 being for image pickup while the openings 220 and 221, the openings 222 and 223, and the openings 224 and 225 are paired for large-defocus detection. The opening 227 is used when a light beam is limited with the first diaphragm ST1, and at the image pickup, concurrently with the setting of the opening 227 of the second diaphragm ST2, one of the openings of the first diaphragm ST1 is automatically selected according to the luminance of the object to be imaged. Alternatively, a user can arbitrarily select one of them.

Each microlens provided on the image pickup element 100 projects each light-receiving section of the image pickup element 100 to an exit pupil of the image pickup optical system, and is used for establishing a linear relationship between the light quantity incident on each light-receiving section of the image pickup element 100 and the opening degree of the first diaphragm ST1. The power thereof is set so that the projected image of each light-receiving section becomes larger than the exit pupil of the image pickup optical system 24 at the release of the first diaphragm ST1. That is, when the light-receiving section projected image and the opening are compared with each other on the diaphragm ST1, the light-receiving section projected image is larger than the largest opening of the first diaphragm ST1. In this way, the incident light quantity on the image pickup element 100 becomes approximately proportional to the diaphragm opening area, and knowing the subject luminance and the sensitivity of the image pickup element 100, the diaphragm opening degree and the shutter speed are calculable in the same manner as that for a film camera. That is, the incident light quantity becomes proportional to the diaphragm opening area to satisfy the calculation according to the APEX mode.

At the large-defocus detection, there are used any one of sets of openings 220 and 221, 222 and 223, 224 and 225 of the second diaphragms ST2 and the largest opening of the first diaphragm ST1 for ensuring that the light beam depends upon the opening of the second diaphragm ST2.

When the openings 220 and 221 are used, the state of division of the exit pupil becomes as shown in FIG. 30 in the case of the first embodiment. As mentioned above, in the illustration, numerals 213 and 214 represent virtual images of second diaphragm openings 220 and 221, in place of the diaphragm openings 207 and 208, viewed through the rear lens group 202, and signify a third area and a fourth area, formed on the exit pupil by means of the openings 220 and 221.

The third area 213 is included in the first area 220 while the fourth area 214 is included in the second area 221. Therefore, the openings 220 and 221 determine the configuration of the exit pupil. A light beam passing through the opening 220 is incident on the first photoelectric conversion while a light beam passing through the opening 221 is incident on the second photoelectric conversion section.

Although the first area 220 and the second area 221 is affected by the accuracy of the pupil projection by the microlens, the third area 213 and the fourth area 214 is not affected by the accuracy of the pupil projection by the microlens. Accordingly, even if a microlens manufacturing error occurs and even if the positions of the first area 220 and the second area 221 vary according to pixel, the use of the openings 220 and 221 can provide the third area 213 and the fourth area 214 in a fixed condition.

For example, if the configurations of the openings 220 and 221 are made to be an ellipse or a circle, since they are the same configurations which can overlap with each other according to the parallel movement, the signals of the first and second photoelectric conversion sections have a relationship in which only their phases are fully shifted from each other. Additionally, they are not affected by the microlens manufacturing error. Accordingly, even if the defocus is large, it is possible to suppress the defocus quantity detection error to an extremely small value.

As mentioned above, the use of the openings 220 and 221 enables the large-defocus detection. Meanwhile, in general, it is practically convenient that the shortest imaging distance D[m] of the taking lens is given by the following equation (1) as a function of an imaging field angle θ[°].

$$D=0.2/\tan(\theta/2) \quad (1)$$

When the shortest imaging distance is defined in this way, the drawing-out of the imaging lens is set at the shortest imaging distance, and the defocus quantity in a case in which an object at infinity is captured is approximately proportional to the square of the focal length of the taking lens. Therefore, in the case of the employment of a super telephoto lens in which a taking lens has an extremely long focal length, or in the case of the selection of the zoom telephoto side, an extremely large defocus can occur, and the phase shifting of the signals of the first and second photoelectric conversion sections is too large, which may cause the common range of the signals to disappear. Naturally, in this case, the phase difference detection becomes impossible.

Figure 31:
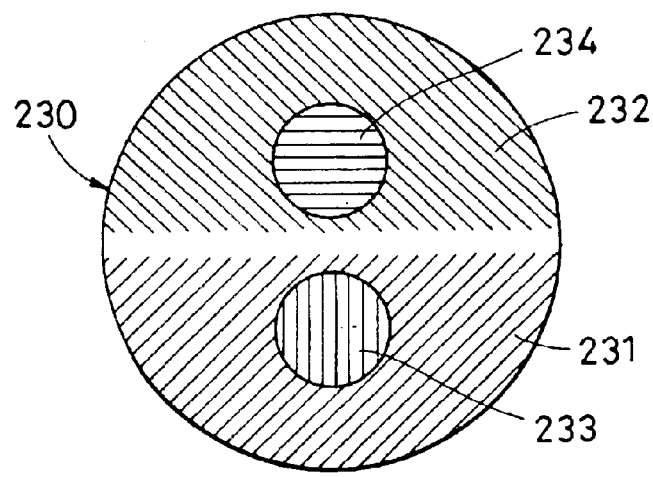
FIG. 31 is an illustration useful for describing a state of division of an exit pupil at detection of a large defocus according to the invention.

FIG. 31 is an illustration of a state of division of an exit pupil in a case of employment of the openings 222 and 223, having a function to reduce the phase shift quantity taking place at a unit defocus, for coping with such a situation. In FIG. 31, numeral 230 represents an exit pupil in a case in which the first diaphragm ST1 is in a released condition, numeral 231 designates a first area on the exit pupil through which an light beam incident on the first photoelectric conversion section of the image pickup element 100 passes, and numeral 232 denotes a second area on the exit pupil through which a light beam incident on the second photoelectric conversion section of the image pickup element 100 passes. Numerals 233 and 234 signify virtual images of the diaphragm openings 222 and 223 viewed through the rear lens group 202, and denote a third area and a fourth area on the exit pupil, formed by the openings 222 and 223.

The third area 233 is included in the first area 231 while the fourth area 234 is included in the second area. Therefore, the openings 222 and 223 determine the configuration of the exit pupil. A light beam passing through the opening 222 is incident on the first photoelectric conversion section while a light beam passing through the opening 223 is incident on the second photoelectric conversion section. As compared with the openings 220 and 221, the third and fourth areas on the exit pupil are smaller, and hence, it is possible to decrease the phase shift quantity occurring at the unit defocus. Additionally, if the openings 224 and 225 are put to use, it is possible to further reduce the phase shift quantity occurring at the unit defocus.

Figure 32:
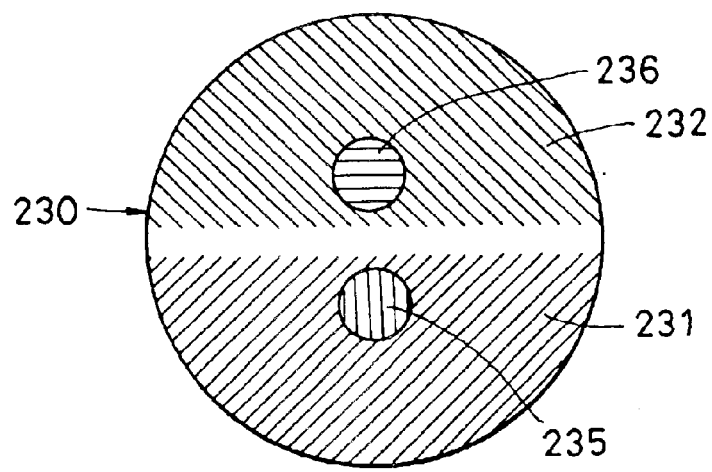
FIG. 32 is an illustration useful for describing a state of division of an exit pupil at detection of a large defocus according to the invention.

FIG. 32 shows a state of division of an exit pupil in the case of the openings 224 and 225. In FIG. 32, numerals 235 and 236 designate virtual images of the diaphragm openings 224 and 225 in FIG. 30 viewed through the rear lens group 202, and signify a third area and a fourth area on the exit pupil formed by the openings 224 and 225.

The third area 235 is included in the first area 231 while the fourth area 236 is included in the second area. Accordingly, the openings 222 and 223 determine the configuration of the exit pupil. A light beam passing through the opening 224 is incident on the first photoelectric conversion section while a light beam passing through the opening 225 is incident on the second photoelectric conversion section.

In the case of the employment of a super telephoto lens, or in the case of the selection of the zoom telephoto side, a control circuit for the focusing or the like first uses the openings 224 and 225 at the first focusing operation in which the possibility of the in-focus state with respect to an object is extremely low, and irrespective of the occurrence of an extremely large defocus, performs a monitor display for the focusing and the object observation coping with this, and then uses the openings 222 and 223 in the second focusing operation, and further uses the openings 220 and 221 in the third focusing operation. That is, the openings to be used are switched successively.

When the fact of a small defocus quantity becomes clear, a sequence in the image pickup unit may be made such that the control circuit sets the second diaphragm opening 227 and, at the same time, selects one of the first diaphragm openings according to the luminance of an object to be photographed to perform the remaining focusing and monitor display, then preparing for the subsequent image pickup.

As described above, the present invention comprises an image-formation lens, a solid-state image pickup element for obtaining a photoelectric conversion output corresponding to a light beam from a first area of an exit pupil of the image-formation lens and a photoelectric conversion output corresponding to a light beam from a second area thereof, light-intercepting means provided in the image-formation lens and having a third area included in the first area and a fourth area included in the second area for allowing light to pass through the third and fourth areas and for inhibiting light from passing through other than the third and fourth areas, and arithmetic means for detecting an image formation state of the image-formation lens on the basis of the photoelectric conversion outputs, and provides the following effects.

(1) It is possible to provide a phase difference detection type focus detecting device for use in an image pickup unit which is capable of detecting a large defocus in a state where the incident light quantity on the image pickup element is made to be approximately proportional to the diaphragm opening area.

(2) It is possible to detect a large defocus while accepting a microlens manufacturing error to some degree.

(3) It is possible to accomplish the size reduction of the image pickup system because there is no need to use a mirror or a prism for optical path division.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A focus detecting device for use in an image pickup optical unit, said device comprising:
  a photoelectric conversion portion having (a) a first photoelectric conversion unit which performs photoelectric conversion of a light beam emitted from a first pupil area of said image pickup optical unit, (b) a second photoelectric conversion unit which performs photoelectric conversion of a light beam emitted from a second pupil area of said image pickup optical unit, said second pupil area being different from said first pupil area, and (c) a microlens which is common to said first and second photoelectric conversion units;
  an image pickup unit having a plurality of said photoelectric conversion portions on an image pickup surface;
  a light blocking unit having a portion for blocking light, a first opening for allowing passage of a portion of light in said first pupil area, and a second opening for allowing passage of a portion of light in said second pupil area, wherein, for the first opening and the second opening, the portion of light having passed is guided onto an image pickup surface of said image pickup unit; and
  a detecting unit which detects a focus condition of said image pickup optical unit on the basis of photoelectric conversion outputs of said first photoelectric conversion unit and said second photoelectric conversion unit.

2. A device according to claim 1, wherein a color filter is placed in front of said first photoelectric conversion unit and said second photoelectric conversion unit.

3. A device according to claim 1, wherein, for the focus detection by said detecting unit, said light blocking unit is set in the optical path of said image pickup optical unit.

4. A device according to claim 1, further comprising a signal processing circuit for producing an image signal by adding a photoelectric conversion signal from said first photoelectric conversion unit and a photoelectric conversion signal from said second photoelectric conversion unit.

5. A device according to claim 1, wherein said first and second openings have the same size and shape.

6. A device according to claim 5, wherein said first and second openings have an elliptical shape.

7. A device according to claim 1, wherein said light blocking unit is part of a rotatable diaphragm.

8. A device according to claim 7, wherein said light blocking unit is removed from the optical path of said image pickup optical unit by rotating said rotatable diaphragm.

9. A device according to claim 7, wherein said rotatable diaphragm has at least one opening in addition to said first and second openings, for allowing passage of light.

10. A device according to claim 9, wherein, for the focus detection by said detecting unit, said light blocking unit is set in the optical path of said image pickup optical unit.

11. A device according to claim 9, wherein an opening of said at least one opening is set in the optical path of said image pickup optical unit by rotating said rotatable diaphragm.

12. A device according to claim 9, wherein said at least one opening comprises a plurality of openings each having a different size.

13. A device according to claim 12, wherein one of said plurality of openings is set in the optical path of said image pickup optical unit by rotating said rotatable diaphragm.

14. A device according to claim 12, wherein, for the focus detection by said detecting unit, said light blocking unit is set in the optical path of said image pickup optical unit.

15. A device according to claim 7, wherein said rotatable diaphragm comprises a plurality of pairs of openings for allowing passage of light, with said first and second openings being one of said plurality of pairs of openings, and wherein said rotatable diaphragm is used in conjunction with another rotatable diaphragm having a plurality of openings for allowing passage of light, each one of said plurality of openings having a different size.

16. A device according to claim 15, wherein one of said rotatable diaphragms is closer to an image plane side of said image pickup optical unit than the other of said rotatable diaphragms.

17. A device according to claim 15, wherein, for the focus detection by said detecting unit, said light blocking unit is set in the optical path of said image pickup optical unit.

18. A device according to claim 12, wherein one of said plurality of openings is set in the optical path of said image pickup optical unit by rotating said rotatable diaphragm, wherein, for the focus detection by said detecting unit, said light blocking unit is set in the optical path of said image pickup optical unit, wherein said one of said plurality of openings and said light blocking unit are not set in the optical path of said image pickup optical unit at the same time, and wherein said light blocking unit is removed from the optical path of said image pickup optical unit by rotating said rotatable diaphragm.

19. A device according to claim 1, wherein said microlens projects a projection image on said first photoelectric conversion unit and said second photoelectric conversion unit, and wherein said projection image is larger than an entire exit pupil of said image pickup optical unit.

20. A focus detecting device for use in an image pickup optical unit, said device comprising:

a photoelectric conversion portion having (a) first photoelectric conversion means for performing photoelectric conversion of a light beam emitted from a first pupil area of said image pickup optical unit, (b) second photoelectric conversion means for performing photoelectric conversion of a light beam emitted from a second pupil area of said image pickup optical unit, said second pupil area being different from said first pupil area, and (c) a microlens which is common to said first and second photoelectric conversion means;

an image pickup unit having a plurality of said photoelectric conversion portions on an image pickup surface;

light blocking means having a portion for blocking light, a first opening for allowing passage of a portion of light in said first pupil area, and a second opening for allowing passage of a portion of light in said second pupil area, wherein, for the first opening and the second opening, the portion of light having passed is guided onto an image pickup surface of said image pickup unit; and detecting means for detecting a focus condition of said image pickup optical unit on the basis of photoelectric conversion outputs of said first photoelectric conversion means and said second photoelectric conversion means.

* * * * *

UNITED STATES PATENT AND TRADEMARK OFFICE
CERTIFICATE OF CORRECTION

PATENT NO.    : 6,933,978 B1
DATED         : August 23, 2005
INVENTOR(S)   : Yasuo Suda It is certified that error appears in the above-identified patent and that said Letters Patent is hereby corrected as shown below:

Title page,
Item [57], ABSTRACT,
Line 3, "a image" should read -- an image --.

Column 6,
Line 45, "MOSS" should read -- MOS --.
Line 49, "an photoelectric" should read -- a photoelectric --.
Line 64, "an vertically" should read -- a vertically --.

Column 9,
Line 10, "With" should read -- with --.

Column 10,
Line 18, "conversion G2" should read -- conversion section G2 --.
Line 25, "optical axis" should read -- optical axis L1 --.

Column 13,
Line 21, "increase" should read -- increases --.

Column 15,
Line 3, "φPGoo" (second occurrence) should read -- φPGeo --.

Column 17,
Line 22, "pulse $\phi T_N$," should read -- pulse $\phi T_N$ --.

Column 18,
Line 9, "pixels" should read -- pixel --.

Column 20,
Line 10, "an phase" should read -- a phase --.

UNITED STATES PATENT AND TRADEMARK OFFICE
CERTIFICATE OF CORRECTION

PATENT NO.   : 6,933,978 B1
DATED        : August 23, 2005
INVENTOR(S)  : Yasuo Suda It is certified that error appears in the above-identified patent and that said Letters Patent is hereby corrected as shown below:

Column 24,
Line 55, "an light" should read -- a light --.

Signed and Sealed this

Seventh Day of February, 2006

JON W. DUDAS
*Director of the United States Patent and Trademark Office*